United States Patent
Shibayama et al.

(10) Patent No.: US 10,158,869 B2
(45) Date of Patent: Dec. 18, 2018

(54) PARALLEL VIDEO DECODING PROCESSING APPARATUS AND OPERATING METHOD THEREOF

(71) Applicant: Renesas Electronics Corporation, Kawasaki-shi, Kanagawa (JP)

(72) Inventors: Tetsuya Shibayama, Kanagawa (JP); Seiji Mochizuki, Kanagawa (JP); Kenichi Iwata, Kanagawa (JP); Motoki Kimura, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 685 days.

(21) Appl. No.: 14/505,278

(22) Filed: Oct. 2, 2014

(65) Prior Publication Data

US 2015/0092849 A1    Apr. 2, 2015

(30) Foreign Application Priority Data

Oct. 2, 2013 (JP) ................................. 2013-207145

(51) Int. Cl.
| | | |
|---|---|---|
| *H04N 7/12* | (2006.01) | |
| *H04N 11/02* | (2006.01) | |
| *H04N 19/44* | (2014.01) | |
| *H04N 19/61* | (2014.01) | |
| *H04N 19/436* | (2014.01) | |

(52) U.S. Cl.
CPC .......... *H04N 19/44* (2014.11); *H04N 19/436* (2014.11); *H04N 19/61* (2014.11)

(58) Field of Classification Search
None
See application file for complete search history.

(56) References Cited

U.S. PATENT DOCUMENTS

| | | |
|---|---|---|
| 8,223,838 B2 | 7/2012 | Iwata et al. |
| 8,311,111 B2 | 11/2012 | Xu et al. |
| (Continued) | | |

FOREIGN PATENT DOCUMENTS

| | | |
|---|---|---|
| CN | 102150425 A | 8/2011 |
| JP | 2008-042571 A | 2/2008 |

OTHER PUBLICATIONS

Gary J. Sullivan et al, "Video Compression—From Concept to the H.264/AVC Standard", Proceedings of the IEEE, vol. 93, No. 1, Jan. 2005, pp. 18-31.

(Continued)

*Primary Examiner* — Jessica M Prince
(74) *Attorney, Agent, or Firm* — Shapiro, Gabor and Rosenberger, PLLC

(57) ABSTRACT

A video decoding processing apparatus which can reduce overhead for the start of parallel decoding processing. The video decoding processing apparatus includes a parsing unit, and first and second video processing units. A coding bit stream including information of largest coding units each having at least a prescribed pixel size is supplied to an input terminal of the parsing unit. The parsing unit performs parsing of the syntax of the coding bit stream to thereby generate parallel-processable first and second intermediate streams from the largest coding unit. The first and second video processing units parallel-process the first and second intermediate streams generated from the parsing unit.

20 Claims, 10 Drawing Sheets

(56) References Cited

U.S. PATENT DOCUMENTS

| | | | | |
|---|---|---|---|---|
| 2006/0126726 A1* | 6/2006 | Lin | ................... | H04N 19/172 |
| | | | | 375/240.03 |
| 2010/0061455 A1* | 3/2010 | Xu | ..................... | H04N 19/51 |
| | | | | 375/240.13 |
| 2012/0106652 A1 | 5/2012 | Huang et al. | | |
| 2013/0107952 A1* | 5/2013 | Coban | ............... | H04N 19/105 |
| | | | | 375/240.12 |
| 2013/0202051 A1* | 8/2013 | Zhou | ............ | H04N 19/00521 |
| | | | | 375/240.26 |

OTHER PUBLICATIONS

Gary J. Sullivan et al, "Overview of the High Efficiency Video Coding (HEVC) Standard", IEEE Transactions on Circuits and Systems for Video Technology, vol. 22, No. 12, Dec. 2012, pp. 1649-1668.

Mauricio Alvarez Mesa et al, "Evaluation of Parallelization Strategies for the Emerging HEVC Standards", pp. 1-17, http://www.encore-project.eu/system/files/hevc_paper.pdf#search='evaluation+of+parallel+strategies+for+emegin+HEVC' [retrieved on Sep. 26, 2013].

Jie Jiang et al, "Block-Based Parallel Intra Prediction Scheme for HEVC", Journal of Multimedia, vol. 7, No. 4, Aug. 2012, pp. 289-294.

Office Action dated May 23, 2017, in Japanese Patent Application No. 2013-207145.

Office Action dated Jun. 19, 2018, in Chinese Patent Application No. 201410515393.X.

* cited by examiner

FIG. 2

| | | | | | | | | | | | |
|---|---|---|---|---|---|---|---|---|---|---|---|
| 20(CE00)<br>21(CE01) | LCU00 | LCU01 | LCU02 | LCU03 | LCU04 | LCU05 | LCU06 | LCU07 | LCU08 | LCU09 | ------ | LCU063 |
| 22(CE10)<br>23(CE11) | LCU10 | LCU11 | LCU12 | LCU13 | LCU14 | LCU15 | LCU16 | LCU17 | LCU18 | LCU19 | ------ | LCU163 |
| 24(CE20)<br>25(CE21) | LCU20 | LCU21 | LCU22 | LCU23 | LCU24 | LCU25 | LCU26 | LCU27 | LCU28 | LCU29 | ------ | LCU263 |
| 26(CE30)<br>27(CE31) | LCU30 | LCU31 | LCU32 | LCU33 | LCU34 | LCU35 | LCU36 | LCU37 | LCU38 | LCU39 | ------ | LCU363 |

FIG. 9

| LCU00 | LCU01 | LCU02 | LCU03 | LCU04 | LCU05 | LCU06 | LCU07 | LCU08 | LCU09 | | | | LCU063 |
|---|---|---|---|---|---|---|---|---|---|---|---|---|---|
| LCU10 | LCU11 | LCU12 | LCU13 | LCU14 | LCU15 | LCU16 | LCU17 | LCU18 | LCU19 | | | | LCU163 |
| LCU20 | LCU21 | LCU22 | LCU23 | LCU24 | LCU25 | LCU26 | LCU27 | LCU28 | LCU29 | | | | LCU263 |
| LCU30 | LCU31 | LCU32 | LCU33 | LCU34 | LCU35 | LCU36 | LCU37 | LCU38 | LCU39 | | | | LCU363 |
| LCU310 | LCU311 | LCU312 | LCU313 | LCU314 | LCU315 | LCU316 | LCU317 | LCU318 | LCU319 | | | | LCU3163 |

FIG. 10

| | | | | | | | | | | | |
|---|---|---|---|---|---|---|---|---|---|---|---|
| CE0 | LCU00 | LCU01 | LCU02 | LCU03 | LCU04 | LCU05 | LCU06 | LCU07 | LCU08 | LCU09 | ------ | LCU63 |
| CE1 | NOP | NOP | LCU10 | LCU11 | LCU12 | LCU13 | LCU14 | LCU15 | LCU16 | LCU17 | LCU18 | LCU19 |
| CE2 | NOP | NOP | NOP | NOP | LCU20 | LCU21 | LCU22 | LCU23 | LCU24 | LCU25 | LCU26 | LCU27 |
| CE4 | NOP | NOP | NOP | NOP | NOP | NOP | LCU30 | LCU31 | LCU32 | LCU33 | LCU34 | LCU35 |

PARALLEL VIDEO DECODING PROCESSING APPARATUS AND OPERATING METHOD THEREOF

CROSS-REFERENCE TO RELATED APPLICATIONS

The disclosure of Japanese Patent Application No. 2013-207145 filed on Oct. 2, 2013 including the specification, drawings and abstract is incorporated herein by reference in its entirety.

BACKGROUND

The present invention relates to a video decoding processing apparatus and an operating method thereof, and particularly to a technology effective in reducing overhead for the start of parallel decoding processing.

As has been well known, a general compression system of a moving picture based on the standard of MPEG-2 standardized by the international standard ISO/IEC 13818-2 has been based on the principle that a video storage capacity and a required bandwidth are reduce by reducing redundant information from a video stream. Incidentally, MPEG is an abbreviation of Moving Picture Experts Group.

Since the MPEG-2 standard defines only a syntax (a rule for compressed and encoded data sequence or a construction method of a bit stream of encoded data) of a bit stream, and a decode process, it is one flexible in such a manner as to be sufficiently available under various kinds of circumstances such as a satellite broadcasting/service, a cable television, an interactive television, Internet, etc.

In an encode process of MPEG-2, a video signal is first sampled and quantized to define components of a color difference of each pixel and brightness thereof in digital video. Values indicative of the components of the color difference and brightness are stored in a structure known as a macro block. The values thereof stored in the macro block are transformed to frequency values using discrete Cosine Transform (DCT). The transform coefficients obtained by DCT have frequencies different according to the brightness and color difference of each picture. The quantized DCT transform coefficients are encoded by variable length coding (VLC) for further compressing a video stream.

Additive compression based on a motion compression technique has been defined in the encode process of MPEG-2. Pictures or frames of three kinds of an I frame, a P frame and a B frame exist in the MPEG-2 standard. The I frame is an intra-coded frame meaning that it is reproduced without referring to any other pictures or frames in the video stream. The P and B frames are inter-coded frames meaning that they are reproduced referring to other pictures or frames. For example, the P and B frames include motion vectors indicative of motion estimation with respect to a reference frame. With the use of the motion vectors, it is possible for an MPEG encoder to reduce a bandwidth necessary for a specific video stream. Incidentally, the I frame is called an intra-coded frame, the P frame is called a predictive-coded frame, and the B frame is called a bi-directional predictive-coded frame, respectively.

Accordingly, an MPEG-2 encoder is comprised of a frame memory, a motion vector detector, a motion compensator, a subtractor, a DCT transformer, a quantizer, an inverse quantizer, an inverse DCT transformer, a variable length encoder, and an adder. An encoded video signal is stored in the frame memory to perform encoding of the P and B frames and detect motion vectors. Thereafter, the encoded video signal is read from the frame memory, and a motion compensation prediction signal from the motion compensator is subtracted by the subtractor. DCT transformation processing and quantization processing are performed thereon by the DCT transformer and the quantizer respectively. A quantized DCT transform coefficient is subjected to variable length coding processing by the variable length encoder and then subjected to local decoding processing by the inverse quantizer and the DCT transformer. Afterwards, the result of this local decoding processing is directly supplied to the adder and supplied to the subtractor via the motion compensator.

On the other hand, an MPEG-2 decoder is comprised of a buffer memory, a variable length decoder, an inverse quantizer, an inverse DCT transformer, a motion compensator, an adder, and a frame memory. A coding bit stream based on MPEG-2 is stored in the buffer memory and thereafter subjected to variable length decoding processing, inverse quantization processing, and inverse DCT transformation processing by the variable length decoder, the inverse quantizer and the inverse DCT transformer respectively. A prediction image obtained by the motion compensator from the motion vectors subjected to the variable length decoding processing, and the result of the inverse DCT transformation processing are added thereto by the adder. A reproduced image signal is generated from the output of the adder. The reproduced image signal is stored in the frame memory and used for prediction of another frame.

There has been proposed a moving picture or video compressing system based on the standard (H. 263) of MPEG-4 following the MPEG-2 standard, standardized by the internal standard ISO/IEC 14496 for low-rate encoding of a television telephone or the like. The compression system based on the MPEG-4 (H. 263) standard is called a "hybrid type" using an inter-frame prediction and discrete cosine transform as with the MPEG-2. Further, motion compensation in a half pel unit has been introduced therein. This compression system has been improved in compression ratio by introducing a technique called three-dimensional variable length coding (3-D VLC) that uses the Huffman code used as entropy coding, but newly encodes run/level/last simultaneously, like the M-PEG2. Incidentally, the run and level relate to a coefficient of a run length, and the last indicates whether or not it is the last coefficient. Further, the MPEG-4 (H. 263) standard includes a basic portion called a Baseline and an extended standard called Annex.

In order to bring the compression system based on the MPEG-4 (H. 263) to higher encoding efficiency, the standard of MPEG-4 AVC (H. 264) has been standardized by the international standard ISO/IEC 14496-10. Incidentally, AVC is an abbreviation of Advanced Video Coding. The MPEG-4 AVC (H. 264) standard is called H. 264/AVC standard.

Video coding based on the H. 264/AVC standard is comprised of a video coding layer and a network abstraction layer. That is, the video coding layer is designed to effectively represent a video context. The network abstraction layer serves to format a video VCL representation and give header information by a method suitable for transfer by various transfer layers or storage media.

In the international standard video encoding method based on MPEG-2, MPEG-4, H. 264/AVC standard or the like, inter-frame prediction coding has been used to realize high encoding efficiency utilizing correlation in the time direction. As for frame encoding modes, there are an I frame encoded without using the correlation between frames, a P frame predicted from one frame encoded in the past, and a B frame capable of prediction from two frames encoded in the past.

In the inter-frame prediction coding, a reference image (prediction image) subjected to motion compensation is subtracted from a moving picture, and a predictive residual from this subtraction is encoded. Processing for the encoding includes processing of orthogonal transformation such as DCT (Discrete Cosine Transform), quantization and variable length coding. The motion compensation (motion correction) includes processing of spatially moving a reference frame in inter-frame prediction. The processing of the motion compensation is carried out in block units of frames to be encoded. When there is no motion in image contents, no motion is done and a pixel in the same position as a pixel to be predicted is used. When the motion exists, the most suitable block is searched, and a movement amount is taken as a motion vector. A motion compensation block is a block of 16 pixels×16 pixels/16 pixels×8 pixels in a coding method based on the MPEG-2. In a coding method based on the MPEG-4, it is a block of 16 pixels×16 pixels/16 pixels×8 pixels/8 pixels×8 pixels. In a coding method based on the H. 264/AVC standard, the motion compensation block is a block of 16 pixels×16 pixels/16 pixels×8 pixels/8 pixels×16 pixels/8 pixels×8 pixels/8 pixels×4 pixels/4 pixels×8 pixels/4 pixels×4 pixels.

The above-described coding processing is performed for every video screen (frame or field). Each of fractionated blocks (normally 16 pixels×16 pixels, and called macro blocks (MB) in MPEG) of the screen serves as a processing unit. That is, the most similar block (prediction image) is selected from the reference images already encoded every block to be encoded, and a differential signal between the encoded image (block) and the prediction image is encoded (orthogonal transformation, quantization or the like). The difference in relative position between the encoded block in the screen and the prediction signal is called a motion vector.

Further, a video coding layer (VCL) based on the H. 264/AVC standard has been described in the following Patent Document 1 as being in accordance with an approach called block based hybrid video coding. A VCL design is comprised of a macro block, a slice and a slice block. Each picture is divided into a plurality of macro blocks each having a fixed size. Each macro block includes square picture regions of 16×16 samples as brightness components, and square sample regions respectively related to two color difference components corresponding thereto. One picture can include one or more slices. Each slice is self-inclusive in that it provides an active sequence and a picture parameter set. Since a slice representation can basically be decoded without using information from other slices, a syntax element can be analyzed from a bit stream and the value of a sample of a picture region. However, in order to adapt a deblocking filter over a slice boundary for more complete decoding, several information from other slices are required. Further, since each slice is encoded and decoded independently from other slices of a picture, the ability to use the slice in parallel processing has also been described in the following Non-Patent Document 1.

On the other hand, a system that handles moving picture codes has increased in screen size with respect to a digital HDTV (High Definition Television) broadcasting receiver, a digital video camera capable of photographing or capturing HDTV signals, etc. High processing performance has increasingly been demanded for a video encoder and a view decoder that handle these signals.

From such a background, there has been proposed a new standard H. 265 (ISO/IEC 23008-2) that is a standard following the H. 264/AVC standard. This new standard is also called HEVC (High Efficiency Video Coding). This standard is excellent in compression efficiency due to appropriation of a block size, etc. and has compression performance equivalent to about four times as much as the MPEG-2 standard and approximately twice as much as the standard H. 264/AVC.

On the other hand, the following Patent Document 1 has described that in widely-adopted various coding compression standards such as MPEG-1/2/4, H. 261/H. 263/H. 264-AVC, etc., one macro block comprised of 16×16 pixels has been used as a processing unit for motion compensation and subsequent processing, whereas in the H. 265/HEVC standard, a more flexible block structure has been adopted as a processing unit. The unit of the flexible block structure is called a coding unit (CU) and is adaptively divided into small blocks using a quadtree to achieve satisfactory performance starting with the largest coding unit (LCU). The size of the largest coding unit (LCU) is 64×64 pixels much larger than the size of a macro block of 16×16 pixels. An example of coding unit division based on the quadtree is shown in FIG. 1 of the following Patent Document 1 and the disclosure related to it. At its depth "zero", the first coding unit (CU) is a largest coding unit (LCU) comprised of 64×64 pixels. A split flag "0" indicates that a coding unit (CU) at that time is not divided, whereas a split flag "1" indicates that a coding unit (CU) at that time is divided into four small coding units by a quadtree. The following Patent Document 1 has also described that the post-division coding unit (CU) is further quadtree-divided until it reaches a pre-specified smallest coding unit (CU) size.

The following Patent Document 2 has described that a first video processing unit and a second video processing unit are parallel-operated for video encoding/decoding processing based on the H. 264/AVC standard. During the parallel-operation, the first video processing unit sequentially processes first plural macro blocks arranged in one row of one picture, and the second video processing unit sequentially processes second plural macro blocks arranged in the next one row. Especially, the operation timing of the second video processing unit is delayed by two macro blocks than that of the first video processing unit. As a result, the result of processing of the first plural macro blocks arranged in one row by the first video processing unit can be used upon intra-frame predictions of the second plural macro blocks arranged in the next one row by the second video processing unit.

The outline of the H. 265/HEVC standard has been described in the following Non-Patent Document 2. The core of a coding layer based on the previous standard is a macro block including two color difference samples of a 16×16 block and a 8×8 block being brightness samples, whereas in the H. 265/HEVC standard, it is a coding tree unit (CTU) larger than a traditional macro block and whose size is selected by an encoder. The coding unit (CTU) is comprised of a brightness coding tree block (CTB), a color difference coding tree block (CTB), and a syntax element. A quad-tree-syntax of the coding tree unit (CTU) designates the size and position of each of the brightness and color difference coding tree blocks (CTB). A decision as to whether or not an inter-picture or an intra-picture is used for encoding a picture region is done by the level of the coding unit (CU). A split structure of a prediction unit (PU) has a source in the level of the coding unit (CU). Depending on the decision of a basic prediction type, the brightness and color difference coding blocks (CB) can be divided in terms of their size and predicted from the brightness and color difference prediction blocks (PB). The H. 265/HEVC standard supports the size of variable prediction blocks (PB)

from 64×64 samples to 4×4 samples. A prediction residual is encoded by block transformation, and the three structure of a transform unit (TU) has a source in the level of the coding unit (CU). The residual of the brightness coding block (CB) can be made identical to the brightness transform block (TB) and divided into smaller brightness transform blocks (TB). This is similar even to the color difference transform block (TB). An integer-based function analogous to the function of the discrete cosine transform (DCT) has been defined for the size of a square transform block (TB) of 4×4, 8×8, 16×16 and 32×32 samples. Uniform Reconstruction Quantization (URQ) is used in the H. 265/HEVC standard as with the H. 264/AVC standard. That is, the range of the value of a quantization parameter (QP) is defined between 0 and 51, and the mapping of quantization parameters (QP) approximately corresponds to the logarithm of a quantization scaling matrix.

Further, the following Non-Patent Document 2 has described that a slice based on the H. 265/HEVC standard is a data structure capable of being encoded independently from other slices of the same picture. Furthermore, the following Non-Patent Document 2 has also described that a novel feature of tiles or wavefront-parallel processing (WPP) has been introduced in the H. 265/HEVC standard to modify the structure of slice data with a view to enhancing or packetizing parallel processing capability. The tiles are intended to divide a picture into square regions. A principal objective of the tiles is to increase the capability of parallel processing rather than providing error-recovery capability. A plurality of tiles are independently decodable regions of one picture. These are encoded by shared header information. One slice is divided into rows of a plurality of coding tree units (CTU) by the wavefront-parallel processing (WPP). The first row is processed by the normal method, and the processing of the second row can be started after a slight decision is made to the first row. After a slight decision is made to the second row, the processing of the third row can be started.

The following Non-Patent Document 3 has described that a block structure based on the H. 265/HEVC standard is based on a coding unit (CU) including a prediction unit (PU) and a transform unit (TU), and each frame is divided into an aggregate of largest coding units (LCU) having 64×64 samples in maximum size. There has also been described in the following Non-Patent Document 3 that each largest coding unit (LCU) is circulatingly separated into small coding units (CU) by a general quad-tree split structure.

Parallel-processing related to the H. 265/HEVC standard has been described in the following Non-Patent Document 3. The parallel processing at a function level is configured by, for example, different parallel stages using a frame level/pipeline approach in a video decoder. A four-stage pipeline can be implemented by parsing (syntax interpretation), entropy decoding, LCU reproduction and filtering. An intra prediction has powerful data dependence to prohibit parallel processing at a block level since data reproduced from an adjacent block is used to generate the current block. A proposal to partially remove this dependence has been known as a "parallel prediction unit for parallel intra coding". In parallel processing at a data level, several programs are applied to portions different in data set. In a video codec, the parallel processing at the data level is applied to data grains different in frame level, macroblock (or LCU) level, block level and sample level, for example. The parallel processing at the LCU (or macroblock) level can be utilized inside each frame or between frames if data dependence of different kernels is satisfied. Like the intra prediction, the LCU processing of an inclined wavefront can utilize the parallel processing of LCU in a kernel referring to adjacent data at the LCU level. Further, the parallel processing at a slice level has also been described in the following Non-Patent Document 3.

The following Non-Patent Document 4 has described that in relation to the progress of an image coding standard, a parallel processing trial has been made to coding processing and decoding processing from different viewpoints to be described next since dual core and quad core computers can be utilized. It includes a GOP (Group Of Pictures) approach, a frame approach, a pipeline approach, a slice division approach, a macroblock relocation approach or the like. The macroblock relocation approach is intended to propose the processing of macro blocks (MB) by the arrangement of wavefronts. As a result, when the adjacent macro blocks (MB) are available, the macro blocks (MB) of each inclined line are simultaneously encoded. The macroblock relocation approach has widely been used at the present moment by satisfactory grain parallelism at the macroblock (MB) level.

The following Non-Patent Document 4 has described that in order to achieve a more flexible coding system, the H. 265/HEVC standard makes use of a quad-tree-base coding structure which supports macroblocks (MB) having sizes of 64×64 pixels, 32×32 pixels, 16×16 pixels, 8×8 pixels, and 4×4 pixels. The following Non-Patent Document 4 has described that the H. 265/HEVC standard defines the concepts of three blocks of a coding unit (CU), a prediction unit (PU), and a transform unit (TU) separately. Further, the following Non-Patent Document 4 has described that after the size of a largest coding unit (LCU) and the hierarchical depth of a coding unit (CU) have been defined, the overall structure of Codex is characterized by the sizes of the coding unit (CU), prediction unit (PU) and transform unit (TU).

Further, there has been described in the following Non-Patent Document 4, a method called a block-based parallel intra prediction in relation to the H. 265/HEVC standard. The largest coding unit (LCU) of 64×64 pixels is divided into four blocks of a block 0, a block 1, a block 2 and a block 3. The block 0 and the block 1 configure a first set block, and the block 2 and the block 3 configure a second set block. The blocks 0 and 1 of the first set block are predicted in parallel using pixel values adjacent to the upper and left parts of the first set block. The blocks 2 and 3 of the second set block are predicted in parallel using pixel values adjacent to the upper and left parts of the second set block. In contrast, in a prediction system based on the H. 265/HEVC standard, the pixel values adjacent to the upper and left parts of the block 1 are used for prediction of the block 1. The pixel values adjacent to the upper and left parts of the block 3 are used for prediction of the block 3. Therefore, the blocks 0, 1, 2 and 3 are sequentially predicted.

RELATED ART DOCUMENTS

Patent Documents

[Patent Document 1] U.S. Patent No. 2012/0106652A1 Specification
[Patent Document 2] Japanese Unexamined Patent Publication Laid-Open No. 2008-42571
[Non-Patent Document 1] GARY J. SULLIVAN et al, "Video Compression-From Concept to the H. 264/AVC Standard", PROCEEDING OF THE IEEE, VOL. 93, No. 1 January 2005, PP. 18-31.
[Non-Patent Document 2] Gary J. Sullivan et al, "Overview of the High Efficiency Video Coding (HEVC) Standard", IEEE TRANSACTIONS ON CIRCUITS AND SYSTEMS FOR VIDEO TECHNOLOGY VOL. 22, NO. 12, DECEMBER 2012, PP. 1649-1668.

[Non-Patent Document 3] Mauricio Alvanez Mesa et al, "Evaluation of Parallel Strategies for the Emerging HEVC Standards", pp. 1-17, http://www.encore-project.eu/system/files/hevc_paper.pdf#search='evaluation+of+parallel+strategies+for+emegin+HEVC' [retrieved on September 26 in the 24th of Heisei]

[Non-Patent Document 4] Jie Jiang et al, "Block-Based Parallel Intra Prediction Scheme for HEVC", JOURNAL OF MULTIMEDIA, VOL. 7, NO. 4, AUGUST 2012, pp. 289-294.

SUMMARY

Prior to the present invention, the present inventors have been engaged in the development of a video decoder capable of decoding a bit stream encoded by the H. 265/HEVC standard.

In this development, the present inventors have first performed reviews on the existing image encoding standards and the H. 265/HEVC standard prior to the present invention.

First, the following encoding processing and video encoding are executed in the existing standards such as the above-described MPEG-1/2/4 and H. 261/H.263/H. 264-AVC, etc. In the encoding processing, one video screen of an I frame, a P frame or a B frame is divided into small regions called a plurality of macro blocks (MB). The encoding processing is started from the macro block (MB) placed in the upper left of the one video screen, and sequentially performed on the macro blocks (MB) in the right and lower directions in accordance with the order of raster scans displayed. In the video encoding, moving picture information is compressed using a spatial correlation between macro blocks (MB) in the screen of a moving picture. That is, when one macro block (MB) is processed, information of one macro block (MB) processed from information of its peripheral macro blocks (macro blocks in the upper and left directions of one video screen) is predicted, and only a difference from the predicted information is encoded in video coding processing.

For example, in intra coding processing based on the MPEG-4 AVC (H. 264/AVC standard), an inter-block prediction is performed by DC and AC components of DCT coefficients used as block pixel information. In an inter-block prediction based on the H. 264/AVC standard, the inter-block prediction is executed by DC and AC components of block pixel values subsequent to DCT transform processing.

Further, in a motion prediction for detecting motion vectors for coding processing based on the MPEG-4 and H. 264/AVC standards, block matching between an encoding object block of a frame to be encoded and a plurality of blocks of a reference frame is performed.

In the existing video encoding standards up to the H. 264/AVC standard as described above, the macro block (MB) having the size of 16 pixels×16 pixels is defined as a processing unit.

In contrast, in the H. 265/HEVC standard, a flexible block structure called a coding unit (CU) started from a largest coding unit (LCU) with 64×64 pixels larger than the size of the macro block (MB) of 16×16 pixels being taken as a largest size is adopted as a processing unit.

On the other hand, the method called block-bases parallel intra prediction described in the above Non-Patent Document 4 divides the largest coding unit (LCU) into the four blocks and performs the parallel prediction of the two blocks twice. The method described in the above Non-Patent Document 4 is however applicable only to the encoding system, but does not suggest a decoding processing method based on the H. 265/HEVC taken to be the principal aim of the present invention. That is, the method described in the above Non-Patent Document 4 does not provide a concrete suggestion about decoding processing for realizing parallel processing for speeding-up in the video decoder based on the H. 265/HEVC standard.

That is, in the video encoder, an encoding processing method can be determined by an encoding strategy of itself. Further, upon determining the encoding processing method of the video encoder, whether or not it is based on the existing video coding standard becomes a matter to be determined by the designer of the video encoder. Incidentally, it is needless to say that the video encoder based on the existing video coding standard is appreciated in the markets as compared with the video encoder that does not conform to the existing video coding standard.

In contrast, in the video decoder, a decoding processing method cannot be determined by a decoding strategy of itself. That is, the video decoder is required to have the capacity of being capable of reliably decoding a bit stream encoded by the video encoder in accordance with the encoding processing method based on the existing video coding standard. Accordingly, it is necessary to execute the decoding processing method by the decoding strategy corresponding to the encoding strategy of the encoding processing method of the video encoder. That is, it can be said that the decoding processing method in this case is taken as the processing reverse to the encoding processing method.

In regards to the H. 264/AVC standard, there has been described in the above Patent Document 2 that upon the intra-frame prediction, the parallel processing of each macro block (MB) having the size of 16 pixels×16 pixels is conducted in the two rows in the delay time corresponding to the two macro blocks (MB).

Further, in regards to the H. 265/HEVC standard, as described in the above Patent Document 1, the flexible block structure starting with the largest coding unit (LCU) having the maximum size of 64 pixels×64 pixels larger than the macro block (MB) having the size of 16 pixels×16 pixels is used as the processing unit. Actually, in the H. 265/HEVC standard, there has been described in the above Patent Document 3 that the parallel processing is executed using the intra prediction at the level of the largest coding unit (LCU). That is, the technique described in the Non-Patent Document 3 corresponds to the fact that the "substitution from the macro block (MB) to the largest coding unit (LCU)" is applied to the "parallel processing of the micro block (MB) at the intra-frame prediction" described in the above Patent Document 2.

On the other hand, the present inventors have discussed adopting the parallel processing at the level of the largest coding unit (LCU) described in the above Non-Patent Document 3 in the decoding processing in the development of the video decoding processing apparatus capable of decoding the bit stream encoded by the H. 265/HEVC standard prior to the present invention. That is, while the reference data is supplied from the frame memory to the intra prediction unit of the video decoding processing apparatus, information of an intra prediction calculated by the moving picture or video decoder, which has been transferred by a coding video bit stream, is supplied thereto. Since the intra prediction uses data reproduced from the block made close to generate the present block as described in the above Patent Document 3, the LCU processing of the inclined wavefront becomes necessary for parallel processing of the LCU.

FIG. 9 is a diagram showing the size of a liquid crystal display device supplied with decoded video signals, which has been discussed in the development of a video decoding processing apparatus capable of decoding a bit stream encoded by the H. 265/HEVC standard, which has been made by the present inventors prior to the present invention.

As shown in FIG. 9, the liquid crystal display device has sixty-four largest coding units (LCU) arranged in its horizontal direction on the long side thereof, and thirty-two largest coding units (LCU) arranged in its vertical direction on the short side thereof. Therefore, the size of the liquid crystal display device is a size of 4096 pixels×2048 pixels. Incidentally, here, the largest coding unit (LCU) is set to a size of 64 pixels×64 pixels being of the largest size in the H. 265/HEVC standard. As a result, the 4096 pixels in the horizontal direction on the long side can be realized by the arrangement of the sixty-four largest coding units (LCU) in the horizontal direction on the long side. The 2048 pixels in the vertical direction on the short side can be realized by the arrangement of the thirty-two largest coding units (LCU) in the vertical direction on the short side. The size of the liquid crystal display device is significantly large comparing the magnitude (1920 pixels×1080 pixels) of the size for High Definition HD.

FIG. 10 is a diagram for describing the operation of the video decoding processing apparatus capable of decoding the bit stream encoded by the H. 265/HEVC standard, which has been discussed by the present inventors prior to the present invention.

The video decoding processing apparatus shown in FIG. 10 is equipped with a first video processing unit CE0, a second video processing unit CE1, a third video processing unit CE2, and a fourth video processing unit CE3. A bit stream encoded by the H. 265/HEVC standard is supplied to a variable length decoder unillustrated in FIG. 10 so that intermediate streams supplied from the variable length decoder to the first, second, third and fourth video processing units CE0, CE1, CE2 and CE3 are generated.

The first intermediate stream supplied to the first video processing unit CE0 includes video decoding processing information of sixty-four largest coding units LCU00, LCU01, . . . , and LCU063 arranged in the first row of the liquid crystal display device shown in FIG. 9. Further, the second intermediate stream supplied to the second video processing unit CE1 includes video decoding processing information of sixty-four largest coding units LCU10, LCU11, . . . , and LCU163 arranged in the second row of the liquid crystal display device shown in FIG. 9. The third intermediate stream supplied to the third video processing unit CE2 includes video decoding processing information of sixty-four largest coding units LCU20, LCU21, . . . , and LCU263 arranged in the third row of the liquid crystal display device shown in FIG. 9. Furthermore, the fourth intermediate stream supplied to the fourth video processing unit CE3 includes video decoding processing information of sixty-four largest coding units LCU30, LCU31, . . . , and LCU363 arranged in the fourth row of the liquid crystal display device shown in FIG. 9.

Further, there is shown in FIG. 10 that the second, third and fourth video processing units CE1, CE2 and CE3 respectively take a NO operation (NOP) at a timing at which the first video processing unit CE0 processes the information of the largest coding unit LCU00 arranged in the first row/first column of the liquid crystal display device shown in FIG. 9 and a timing at which the first video processing unit CE0 processes the information of the largest coding unit LCU01 arranged in the first row/second column thereof.

There is also shown in FIG. 10 that the third and fourth video processing units CE2 and CE3 respectively take a NO operation (NOP) at a timing at which the second video processing unit CE1 processes the information of the largest coding unit LCU10 arranged in the second row/first column of the liquid crystal display device shown in FIG. 9 and a timing at which the second video processing unit CE1 processes the information of the largest coding unit LCU11 arranged in the second row/second column thereof.

Furthermore, there is shown in FIG. 10 that the fourth video processing unit CE3 takes a NO operation (NOP) at a timing at which the third video processing unit CE2 processes the information of the largest coding unit LCU20 arranged in the third row/first column of the liquid crystal display device shown in FIG. 9 and a timing at which the third video processing unit CE2 processes the information of the largest coding unit LCU21 arranged in the third row/second column thereof.

Thus, a region for the NO operations (NOP) of the plural largest coding units (LCU), which is in the form of a triangle shown in FIG. 10 corresponds to the inclined wavefront necessary for the parallel processing of the LCU described in the above Non-Patent Document 3. There has however been revealed from the examinations by the present inventors prior to the present invention, a problem that the triangular region for the NO operations (NOP) will increase overhead for the start of parallel decoding processing by the video processing units CE0, CE1, CE2 and CE3.

Although means for solving such a problem, etc. will be described below, other objects and novel features will become apparent from the description of the present specification and the accompanying drawings.

A summary of a representative embodiment disclosed in the present application will be described in brief as follows:

A video decoding processing apparatus (1) according to the representative embodiment is equipped with a parsing unit (10) and first and second video processing units (20) and (21).

A coding bit stream (BS) including information of each of largest coding units (LCU) each having a prescribed pixel size is supplied to an input terminal of the parsing unit (10).

The parsing unit (10) performs parsing of a syntax of the coding bit stream (BS) to thereby generate parallel-processable first and second intermediate streams from the largest coding unit (LCU00).

The first video processing unit (20) and the second video processing unit (21) are characterized by parallel-processing the first intermediate stream and the second intermediate stream generated from the parsing unit (10) (refer to FIG. 1).

An advantageous effect obtained by a representative one of embodiments disclosed in the present application will be described in brief as follows:

According to the present video decoding processing apparatus, it is possible to reduce overhead for the start of parallel decoding processing.

BRIEF DESCRIPTION OF THE DRAWINGS

FIG. 2 is a diagram illustrating the manner in which a plurality of video processing units 20, 21, 22, 23, . . . , and 27 of the video decoding processing apparatus 1 according to the embodiment 1 shown in FIG. 1 respectively execute parallel decoding processing using intra predictions;

FIG. 9 is a diagram showing the size of a liquid crystal display device supplied with decoded video signals, which has been discussed in the development of a video decoding processing apparatus capable of decoding a bit stream encoded by the H. 265/HEVC standard, which has been made by the present inventors prior to the present invention; and FIG. 10 is a diagram for describing the operation of the video decoding processing apparatus capable of decoding the bit stream encoded by the H. 265/HEVC standard, which has been discussed by the present inventors prior to the present invention.

DETAILED DESCRIPTION

1. Summary of the Embodiments

Figure 1:
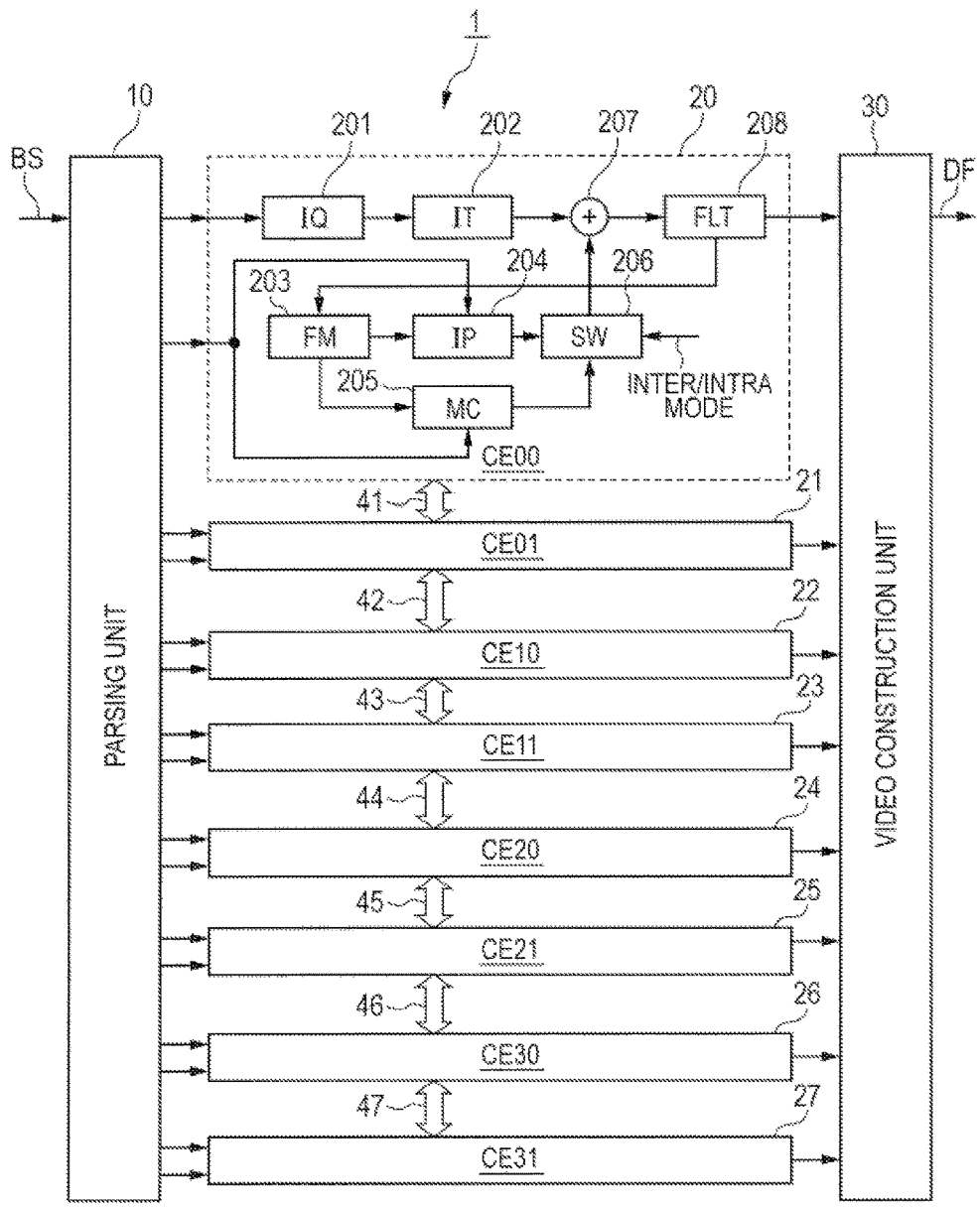
FIG. 1 is a diagram showing a configuration of a video decoding processing apparatus 1 according to an embodiment 1.

A summary of typical embodiments of the invention disclosed in the present application will first be explained. Reference numerals of the accompanying drawings referred to with parentheses in the description of the summary of the typical embodiments only illustrate elements included in the concept of components to which the reference numerals are given.

[1] A video decoding processing apparatus (1) according to a typical embodiment of one aspect of the present invention is equipped with a parsing unit (10) and first and second video processing units (20) and (21).

A coding bit stream (BS) including information of each of largest coding units (LCU) each having a prescribed pixel size is supplied to an input terminal of the parsing unit (10).

The parsing unit (10) performs parsing of a syntax of the coding bit stream (BS) supplied to the input terminal to thereby generate parallel-processable a first intermediate stream ("0", "1", "2", and "3") and a second intermediate stream ("4" and "5") from the largest coding unit (LCU00).

The first video processing unit (20) and the second video processing unit (21) are characterized by parallel-processing the first intermediate stream ("0", "1", "2", and "3") and the second intermediate stream ("4" and "5") generated from the parsing unit (10) (refer to FIG. 1).

According to the above embodiment, it is possible to reduce overhead for the start of parallel decoding processing.

In a preferred embodiment, the first video processing unit (20) and the second video processing unit (21) respectively have a function of intra prediction (204) and a function of inter prediction (205).

Figure 3:
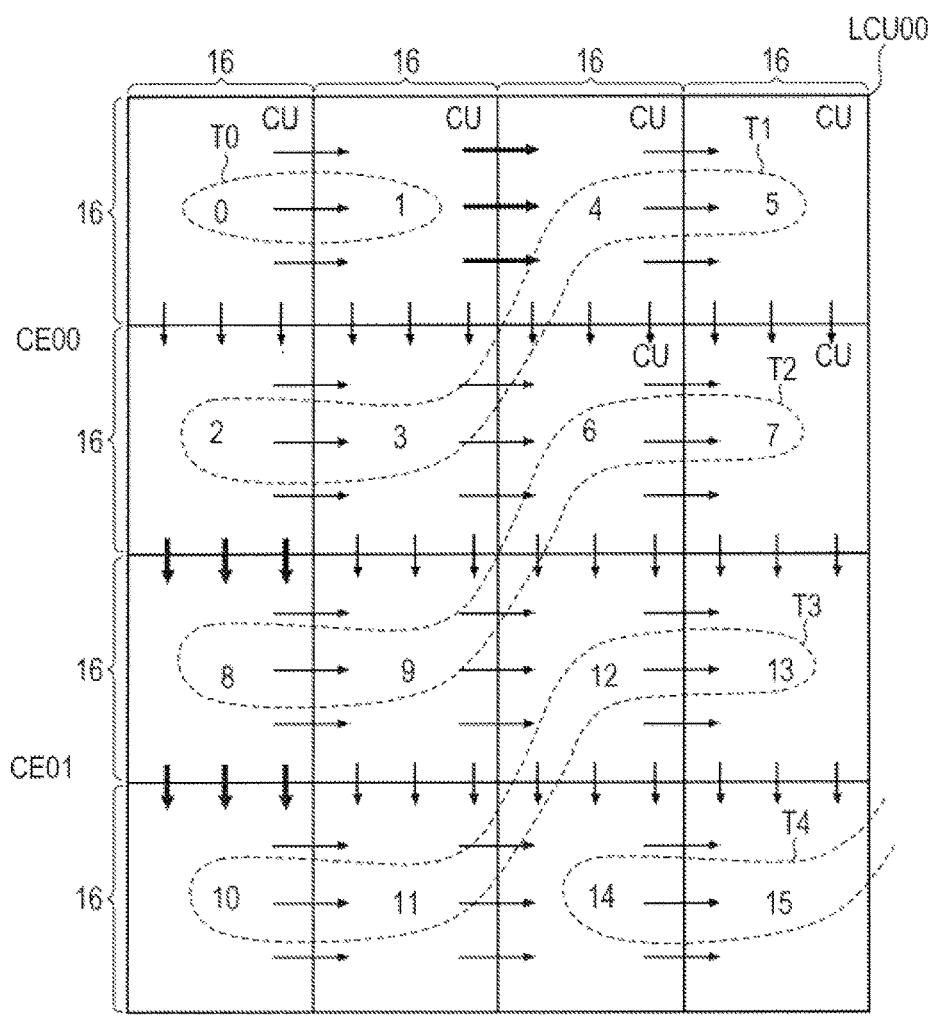
FIG. 3 is a diagram showing the manner in which the first video processing unit 20 (CE00) and the second video processing unit 21 (CE01) both described in FIG. 2 perform parallel decoding processing on information of sixteen small coding units CU0, CU1, CU2, . . . , and CU15 lying inside a largest coding unit LCU00 arranged in a first row/first column of a liquid crystal display device shown in FIG. 9, using intra predictions.
Figure 4:
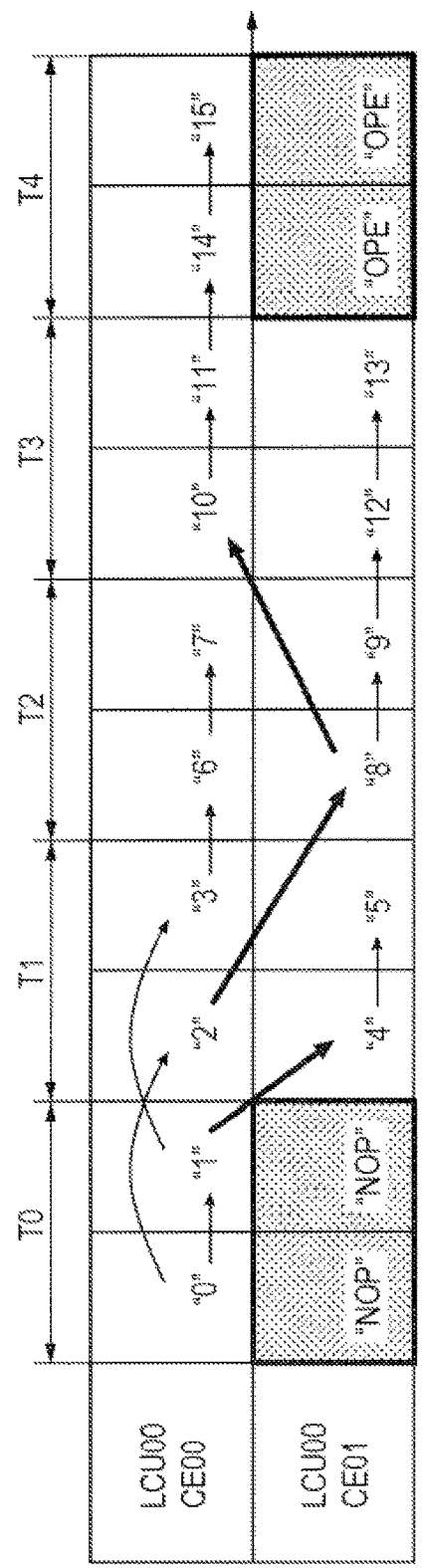
FIG. 4 is a diagram showing timings at which the first video processing unit 20 (CE00) and the second video processing unit 21 (CE01) both shown in FIG. 2 respectively perform parallel decoding processing on the information of the sixteen small coding units CU0, CU1, CU2, . . . , and CU15 shown in FIG. 3, using the intra predictions.

The first video processing unit (20) and the second video processing unit (21) are characterized by performing parallel decoding processing on the first intermediate stream ("0", "1", "2", and "3") and the second intermediate stream ("4" and "5") with respect to at least either one of the intra prediction and the inter prediction (refer to FIGS. 3 and 4).

In another preferred embodiment, the video decoding processing apparatus (1) is further equipped with a first signal path (41) coupled between the first video processing unit (20) and the second video processing unit (21).

A decoding processing result using the intra prediction by either one of the first video processing unit (20) and the second video processing unit (21) is characterized by being capable of being supplied to the other of the first video processing unit (20) and the second video processing unit (21) through the first signal path (41).

In a further preferred embodiment, the parsing unit (10) divides the largest coding unit (LCU00) into a plurality of coding units ("0", "1", "2", "3", "4", "5", . . . , and "15") to thereby generate the first intermediate stream and the second intermediate stream (refer to FIG. 3).

Upon execution of the parallel decoding processing, the second video processing unit (21) is characterized by executing a NO operation (NOP) at a timing (T0) at which the first video processing unit (20) processes the first coding unit ("0" and "1") included in the first intermediate stream (refer to FIG. 4).

In a more preferred embodiment, the parsing unit is characterized by dividing the largest coding unit into at least four coding units to thereby generate the first intermediate stream and the second intermediate stream.

In another more preferred embodiment, the first video processing unit (20) and the second video processing unit (21) are characterized by respectively having a function of inverse quantization (201), a function of inverse transformation (202) and a function of motion compensation (205) (refer to FIG. 1).

In a further more preferred embodiment, the first video processing unit (20) and the second video processing unit (21) are characterized by executing parallel decoding processing of the first intermediate stream ("0", "1", "2", and "3") and the second intermediate stream ("4" and "5") with respect to the inverse quantization and the inverse transformation.

In another preferred embodiment, the first video, processing unit (20) and the second video processing unit (21) are characterized by executing parallel decoding processing of the first intermediate stream ("0", "1", "2", and "3") and the second intermediate stream ("4" and "5") with respect to the motion compensation.

The video decoding processing apparatus (1) according to a further more preferred embodiment is further equipped with a video construction unit (30) having a first input terminal and a second input terminal respectively supplied with a processing result of the first video, processing unit (20) and a processing result of the second video processing unit (21).

A decoded picture suppliable to a display device is characterized by being generated from an output terminal of the video construction unit (30) (refer to FIG. 1).

The video decoding processing apparatus (1) according to a concrete preferred embodiment is further equipped with third and fourth video processing units (22 and 23).

The parsing unit (10) executes the parsing to thereby generate parallel-processable third and fourth intermediate streams from another largest coding unit (LCU10) different from the largest coding unit (LCU00).

Figure 5:
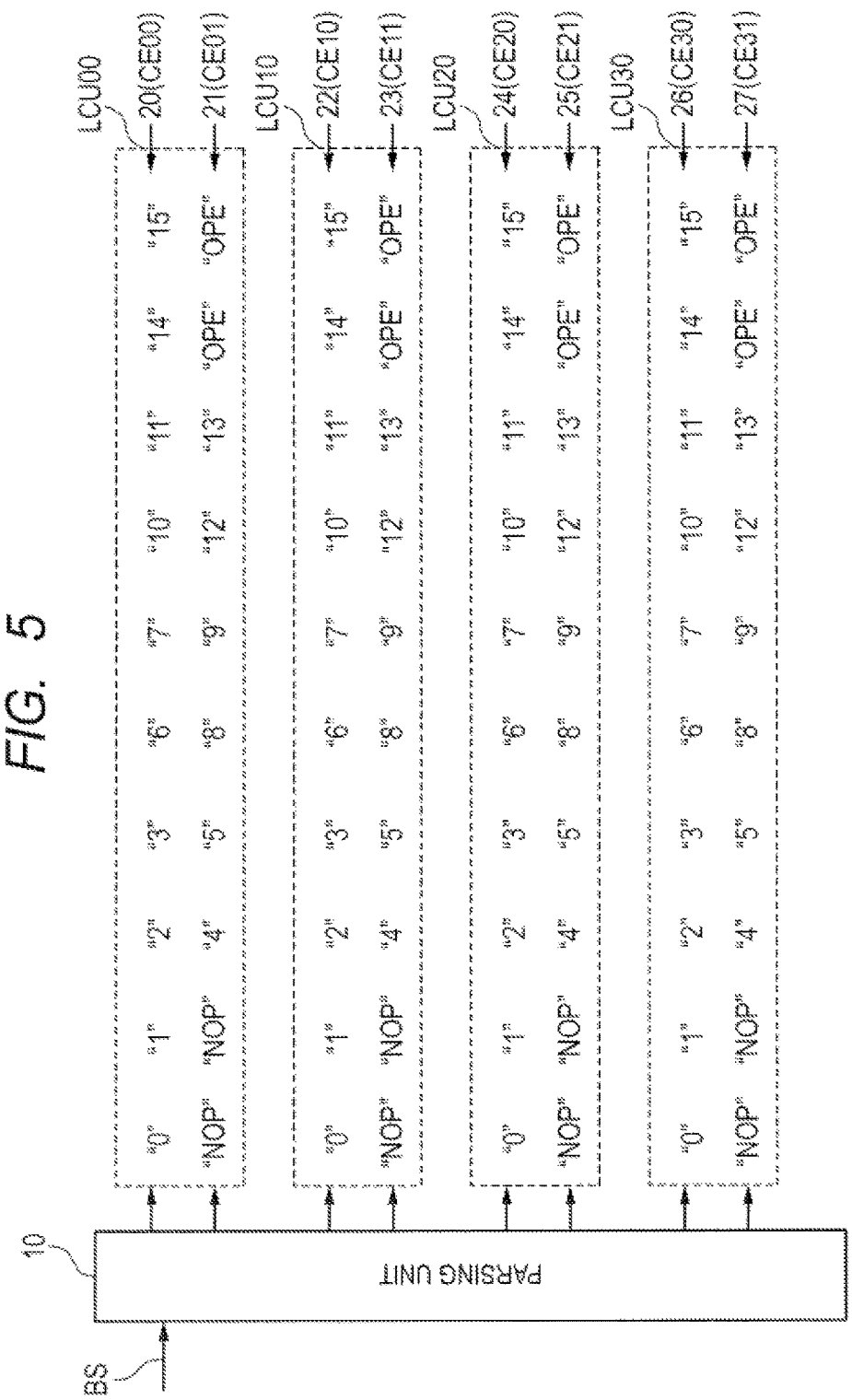
FIG. 5 is a diagram illustrating timings taken to execute parallel decoding processing of internal information of largest coding units LCUs corresponding to four rows by the eight video processing units 20, 21, 22, 23, . . . , and 27 shown in FIG. 1.

The third video processing unit (22) and the fourth video processing unit (23) are characterized by parallel-processing the third intermediate stream and the fourth intermediate stream generated from the parsing unit (10) (refer to FIG. 5).

In another concrete preferred embodiment, the largest coding unit (LCU00) and the other largest coding unit (LCU10) are characterized by respectively corresponding to display information arranged in one row of the display device and other display information arranged in a row next after the one row (refer to FIG. 2).

In a more concrete preferred embodiment, the video decoding processing apparatus (1) is further equipped with a second signal path (43) coupled between the third video processing unit (22) and the fourth video processing unit (23).

A decoding processing result using the intra prediction by either one of the third video processing unit (22) and the fourth video processing unit (23) is characterized by being capable of being supplied to the other of the third video processing unit (22) and the fourth video processing unit (23) through the second signal path (43) (refer to FIG. 1).

In another more concrete preferred embodiment, at the timing (T0), the third video processing unit processes the first coding unit included in the third intermediate stream, and the second video processing unit executes a NO operation (NOP) (refer to FIG. 5).

In a further more concrete embodiment, the parsing unit (10), the first video processing unit (20) and the second video processing unit (21) respectively having the function of the intra prediction, the function of the inverse quantization, and the functions of the inverse transformation and the motion compensation, and the video construction unit (30) are characterized by being integrated inside a semiconductor chip of a semiconductor integrated circuit (refer to FIG. 1).

In another more concrete embodiment, the parsing unit is characterized by executing parsing of the syntax of the coding bit stream including the information of the largest coding unit based on the H. 265/HEVC standard.

In the most concrete embodiment, the largest coding unit is characterized by having a maximum size of 64 pixels×64 pixels by the H. 265/HEVC standard.

[2] A typical embodiment according to another aspect of the present invention is a method for operating a video decoding processing apparatus (1) equipped with a parsing unit (10), and first and second video processing units (20 and 21).

A coding bit stream (BS) including information of each of largest coding units (LCU) each having a prescribed pixel size is supplied to an input terminal of the parsing unit (10).

The parsing unit (10) performs parsing of a syntax of the coding bit stream (BS) supplied to the input terminal to thereby generate parallel-processable first and second intermediate streams ("0", "1", "2" and "3") and ("4" and "5") from the largest coding unit (LCU00).

The first video processing unit (20) and the second video processing unit (21) are characterized by parallel-processing the first intermediate stream ("0", "1", "2" and "3") and the second intermediate stream ("4" and "5") generated from the parsing unit (10) (refer to FIG. 1).

According to the embodiment, it is possible to reduce overhead for the start of parallel decoding processing.

2. Further Detailed Description of the Embodiments

Embodiments will next be explained in further detail. Incidentally, in all of the drawings for explaining the best modes for carrying out the invention, the same reference numerals are respectively attached to components having the same function as in the drawings, and their repetitive description will be omitted.

Embodiment 1

Configuration of Video Decoding Processing Apparatus

FIG. 1 is a diagram showing the configuration of a video decoding processing apparatus 1 according to an embodiment 1.

The video decoding processing apparatus 1 according to the embodiment 1 shown in FIG. 1 is equipped with a parsing unit 10, a plurality of video processing units 20, 21, 22, 23, . . . , and 27, a video construction unit 30, and a plurality of inter-unit signal buses 41, 42, 43, . . . , and 47.

<<Parsing Unit>>

The parsing unit 10 executes parsing (syntax interpretation) of a bit stream BS encoded by the H. 265/HEVC standard and functions as an entropy decoding unit that executes variable length decoding.

Each video encoding processing apparatus unillustrated in FIG. 1 executes parallel encoding processing in accordance with an encoding strategy of the apparatus itself to thereby generate a coding bit stream BS that conforms to the H. 265/HEVC standard.

Thus, the parsing unit 10 of the video decoding processing apparatus 1 according to the embodiment 1 shown in FIG. 1 executes parsing (syntax interpretation) of a syntax (a rule of compressed and encoded data sequence or a construction method of a bit stream of encoded data) of a coding bit stream BS. As a result, it is possible to carry out parallel decoding processing of the video decoding processing apparatus 1, which corresponds to the parallel encoding processing in accordance with the encoding strategy of the unillustrated video encoding processing apparatus.

That is, the parsing unit 10 reverses entropy codes to recover a structure of encoded coding units (CU) of a largest coding unit (LCU) and prediction units (PU), header information of a prediction mode or the like, and encoded prediction units (PU). When the decoded prediction mode is an intra prediction mode, the parsing unit 10 reconstructs information of an intra prediction. On the other hand, when the decoded prediction mode is an inter prediction mode, the parsing unit 10 reconstructs motion vectors. As a result, a plurality of intermediate streams including a plurality of blocks which can be processed in parallel by the video processing units 20, 21, 22, 23, . . . , and 27 are generated from the parsing unit 10 and supplied to the video processing units 20, 21, 22, 23, . . . , and 27. That is, the video processing units 20, 21, 22, 23, . . . , and 27 execute parallel decoding processing with respect to the intra predictions.

<<Video Processing Unit>>

The first video processing unit 20 is equipped with an inverse quantization unit 201, an inverse transformation unit 202, a frame memory unit 203, an intra prediction unit 204, a motion compensation unit 205, a mode switch 206, an addition unit 207 and a filter unit 208.

Prediction residual components of entropy-decoded brightness and color differences are supplied from the parsing unit 10 to an input terminal of the inverse quantization unit 201. The prediction residual components are inversely quantized by the inverse quantization unit 201. An output signal of the inverse quantization unit 201 is transformed to a residual coding unit (CU) by being subjected to processing of inverse discrete cosine transformation (DCT) or inverse discrete sine transformation (DST) by the inverse transformation unit 202. That is, frequency domain data is supplied from the inverse quantization unit 201 to the inverse transformation unit 202, where it is transformed to a residual coding unit (CU).

The residual coding unit (CU) is supplied from the inverse transformation unit 202 to a first input terminal of the addition unit 207. Prediction information is supplied from the mode switch 206 to a second input terminal of the addition unit 207. When the inter prediction mode is shown in a decoded video stream, the mode switch 206 selects a predicted prediction unit (PU) from the motion compensation unit 205. When the intra prediction mode is shown in the decoded video stream, the mode switch 206 selects a prediction unit (PU) from the intra prediction unit 204.

The motion compensation unit 205 uses reference data from the frame memory unit 203 and applies a motion prediction calculated by a video encoding processing apparatus and transmitted in a coding video bit stream to thereby generate a prediction unit (PU). That is, the motion compensation unit 205 generates a prediction unit (PU) by using the motion vectors from the parsing unit 10 and the reference data from the frame memory unit 203.

The intra prediction unit 204 uses peripheral pixels decoded before the current block as reference data and applies an intra prediction calculated by a video encoding processing apparatus designated by the intra prediction mode transmitted in the coding video bit stream to thereby generate a prediction unit (PU).

The addition unit 207 adds the residual coding unit (CU) supplied from the inverse transformation unit 202 and the prediction unit (PU) selected by the mode switch 206 to thereby generate a coding unit (CU).

The filter unit 208 has the function of a deblocking filter for reducing block distortion in accordance with the H. 265/HEVC standard. Further, the filter unit 208 has a filter function called a sample adaptive offset (SAO) different from the deblocking filter function to conform to the H. 265/HEVC standard. This filter function is for satisfactorily reconstructing the amplitude of an original signal by using a lookup table described using additional parameters determined by a frequency distribution analysis on the video encoding processing apparatus side. An output signal of the addition unit 207 is supplied to an input terminal of the filter unit 208 so that a decoded partial image is generated from an output terminal of the filter unit 208. The generated decoded partial image is stored in the frame memory unit 203 as reference data.

Other video processing units 21, 22, 23, . . . , and 27 are also configured exactly in the same manner as the first video processing unit 20. That is, each video processing unit is equipped with the inverse quantization unit 201, the inverse transformation unit 202, the frame memory unit 203, the intra prediction unit 204, the motion compensation unit 205, the mode switch 206, the addition unit 207 and the filter unit 208.

<<Inter-Unit Signal Bus>>

As shown in FIG. 1, the inter-unit signal buses 41, 42, 43, . . . , and 47 are respectively coupled to the video processing units 20, 21, 22, 23, . . . , and 27. As a result, the video processing units 20, 21, 22, 23, . . . , and 27 respectively supply an intra prediction decoding processing result to the mutually adjacent video processing units bidirectionally through the inter-unit signal buses 41, 42, 43, . . . , and 47 in order to execute the parallel decoding processing related to the intra predictions.

<<Video Construction Unit>>

The video construction unit 30 generates a decoded picture corresponding to a decoded frame DF supplied to the liquid crystal display device shown in FIG. 9 on the basis of the decoded partial images generated from the video processing units 20, 21, 22, 23, . . . , and 27.

<<Use of Semiconductor Integrated Circuit>>

The video decoding processing apparatus 1 according to the embodiment 1 shown in FIG. 1 is mostly integrated inside a semiconductor chip of a system LSI semiconductor integrated circuit called a system on-chip (SoC). Most of the frame memory units 203 of the video processing units 20, 21, 22, 23, . . . , and 27 are, however integrated inside a semiconductor chip of a synchronous static random access memory (SRAM) configured separately from the system LSI semiconductor integrated circuit. In other embodiments, however, parts of a plurality of frame memory units 203 of a plurality of video processing units 20, 21, 22, 23, . . . , and 27 can also be integrated inside a semiconductor chip of a system LSI semiconductor integrated circuit for high-speed access.

The decoded picture corresponding to the decoded frame DF generated from the video construction unit 30 and supplied to the liquid crystal display device shown in FIG. 9 can be stored in a semiconductor chip of a graphic memory configured separately from the system LSI semiconductor integrated circuit.

Thus, most of the parsing unit 10, the video processing units 20, 21, 22, 23, . . . , and 27 and the video construction unit 30 in the video decoding processing apparatus 1 according to the embodiment 1 shown in FIG. 1 can be configured inside the semiconductor chip of the system LSI semiconductor integrated circuit. That is, the parsing unit 10, the video processing units 20, 21, 22, 23, . . . , and 27 and the video construction unit 30 can be realized by software configured inside the semiconductor chip of the system LSI semiconductor integrated circuit. Otherwise, the video processing units 20, 21, 22, 23, . . . , and 27 can also be realized by firmware using multi-CPU hardware and software as in the dual-core and quad-core computers described in the Non-Patent Document 4.

<<Parallel Decoding Processing by Plural Video Processing Units>>

FIG. 2 is a diagram showing the manner in which the video processing units 20, 21, 22, 23, . . . , and 27 of the video decoding processing apparatus 1 according to the embodiment 1 shown in FIG. 1 respectively execute parallel decoding processing using the intra predictions.

As shown in FIG. 2, the first video processing unit 20 (CE00) and the second video processing unit 21 (CE01) process information of sixty-four largest coding units LCU00, LCU01, LCU02, . . . , and LCU063 transversely arranged in the first row of the liquid crystal display device shown in FIG. 9.

Also, the third video processing unit 22 (CE10) and the fourth video processing unit 23 (CE11) process information of sixty-four largest coding units LCU10, LCU11, LCU12, . . . , and LCU163 transversely arranged in the second row of the liquid crystal display device shown in FIG. 9.

Further, the fifth video processing unit 24 (CE20) and the sixth video processing unit 25 (CE21) process information of sixty-four largest coding units LCU20, LCU21, LCU22, . . . , and LCU263 transversely arranged in, the third row of the liquid crystal display device shown in FIG. 9.

Furthermore, the seventh video processing unit 26 (CE30) and the eighth video processing unit 27 (CE31) process information of sixty-four largest coding units LCU30, LCU31, LCU32, . . . , and LCU363 transversely arranged in the fourth row of the liquid crystal display device shown in FIG. 9.

As shown in FIG. 2, the processing of the sixty-four LCU00, . . . , and LCU063 of the first row by the first and second video processing units 20 and 21, and the processing of the sixty-four LCU10, . . . , and LCU163 of the second row by the third and fourth video processing units 22 and 23 become parallel decoding processing. Further, the parallel decoding processing, the processing of the sixty-four LCU20, . . . , and LCU263 of the third row by the fifth and sixth video processing units 24 and 25, and the processing of the sixty-four LCU30, . . . , and LCU363 of the fourth row by the seventh and eighth video processing units 26 and 27 become parallel decoding processing. Thus, in order to enable the parallel decoding processing related to the intra predictions of the information of the largest coding units LCUs corresponding to four rows by the eight video processing units 20, 21, 22, 23, . . . , and 27, the largest coding units LCUs corresponding to the four rows are divided into four slices. That is, the sixty-four LCU00, . . . , and LCU63 corresponding to the first row are arranged inside the first slice, the sixty-four LCU10, . . . , and LCU163 corresponding to the second row are arranged inside the second slice, the sixty-four LCU20, . . . , and LCU263 corresponding to the third row are arranged inside the third slice, and the sixty-four LCU30, . . . , and LCU363 corresponding to the fourth row are arranged inside the fourth slice. The reason for this slice division is that since the slices based on the H.265/HEVC standard are decoded independent from other slices of the same picture as described in the above Non-Patent Document 2, the parallel decoding processing of the above slices becomes possible.

Although not illustrated in FIG. 2, the video decoding processing apparatus 1 according to the embodiment 1 shown in FIG. 1 includes a sixty-third video processing unit 262 and a sixth-fourth video processing unit 263. Accordingly, the sixty-third video processing unit 262 and the sixth-fourth video processing unit 263 process information of sixty-four largest coding units LCU310, LCU311, LCU312, . . . , and LCU3163 transversely arranged in the thirty-second row of the liquid crystal display device shown in FIG. 9. Accordingly, the sixty-four video processing units 20, 21, 22, 23, . . . , and 263 of the video decoding processing apparatus 1 according to the embodiment 1 shown in FIG. 1 parallel-process information of 2048 largest coding units (LCU) arranged in the horizontal 64 columns on the long side of the liquid crystal display device shown in FIG. 9 and the vertical 32 rows on the short side thereof.

<<Parallel Decoding Processing of Small Coding Units>>

FIG. 3 is a diagram showing the manner in which the first video processing unit 20 (CE00) and the second video processing unit 21 (CE01) both described in FIG. 2 perform parallel decoding processing on the information of the sixteen small coding units CU0, CU1, CU2, . . . , and CU15 lying inside the largest coding unit LCU00 arranged in the first row/first column of the liquid crystal display device shown in FIG. 9, using the intra predictions.

As shown in FIG. 3, one largest coding unit LCU00 has a large size of 64 pixels×64 pixels, whereas each of the sixteen small coding units CU0, CU1, CU2, . . . , and CU15 has a small size of 16 pixels×16 pixels. The four small coding units CU0, CU1, CU4, and CU5 are arranged in the first row, the four small coding units CU2, CU3, CU6, and CU7 are arranged in the second row, the four small coding units CU8, CU9, CU12, and CU13 are arranged in the third row, and the four small coding units CU10, CU11, CU14, and CU15 are arranged in the fourth row.

As shown in FIG. 3, at a first timing T0, the first and second coding units CU0 and CU1 are sequentially decoding-processed by the first video processing unit 20 (CE00). At a second timing T1, the fifth and sixth coding units CU4 and CU5 are sequentially decoding-processed by the second video processing unit 21 (CE01) in parallel with the third and fourth coding units CU2 and CU3 being sequentially decoding-processed by the first video processing unit 20 (CE00). Incidentally, the second coding unit CU1 is intra-predicted from the first coding unit CU0, the third coding unit CU2 is also intra-predicted from the first coding unit CU0, and the fourth coding unit CU3 is intra-predicted from the second coding unit CU1. Further, the fifth coding unit CU4 is intra-predicted from the second coding unit CU1, and the sixth coding unit CU5 is intra-predicted from the fifth coding unit CU4.

At a third timing T2, the ninth and tenth coding units CU8 and CU9 are sequentially decoding-processed by the second video processing unit 21 (CE01) in parallel with the seventh and eighth coding units CU6 and CU7 being sequentially decoding-processed by the first video processing unit 20 (CE00). Incidentally, the seventh coding unit CU6 is intra-predicted from the fourth coding unit CU3, and the eighth coding unit CU7 is intra-predicted from the seventh coding unit CU6. Further, the ninth coding unit CU8 is intra-predicted from the third coding unit CU2, and the tenth coding unit CU9 is intra-predicted from the ninth coding unit CU8.

At a fourth timing T3, the thirteenth and fourteenth coding units C12 and C13 are sequentially decoding-processed by the second video processing unit 21 (CE01) in parallel with the eleventh and twelfth coding units CU10 and CU11 being sequentially decoding-processed by the first video processing unit 20 (CE00). Incidentally, the eleventh coding unit CU10 is intra-predicted from the ninth coding unit CU8, and the twelfth coding unit CU11 is intra-predicted from the eleventh coding unit CU10. Further, the thirteenth coding unit CU12 is intra-predicted from the tenth coding unit CU9, and the fourteenth coding unit CU13 is intra-predicted from the thirteenth coding unit CU12.

At a fifth timing T4, the fifteenth and sixteenth coding units CU14 and CU15 are sequentially decoding-processed by the first video processing unit 20 (CE00). Incidentally, the fifteenth coding unit CU14 is intra-predicted from the twelfth coding unit CU11, and the sixteenth coding unit CU15 is intra-predicted from the fifteenth coding unit CU14.

In the example of the embodiment 1 shown in FIG. 3, the first video processing unit 20 (CE00) and the second video processing unit 21 (CE01) divide the sixteen small coding units CU0, CU1, CU2, . . . , and CU15 divided from one largest coding unit LCU00 into two to perform parallel decoding processing for the intra predictions. Thus, in the video decoding processing apparatus 1 according to the embodiment 1 shown in FIG. 1, the first video processing unit 20 (CE00) and the second video processing unit 21 (CE01) perform the above-described two division parallel processing even on the respective processing at the inverse quantization unit 201, the inverse transformation unit 202, the motion compensation unit 205 and the filter unit 208.

That is, according to the parsing of the syntax of the coding bit stream BS by the parsing unit 10, the parallel processing related to the inverse quantization processing and the inverse transformation processing is made possible by the video processing units 20, 21, 22, 23, . . . , and 27. Thus, a plurality of intermediate streams including a plurality of blocks which can be processed in parallel with respect to the inverse quantization processing and the inverse transformation processing are generated from the parsing unit 10 by the video processing units 20, 21, 22, 23, . . . , and 27 and supplied to the video processing units 20, 21, 22, 23, . . . , and 27 respectively. As a result, the video processing units 20, 21, 22, 23, . . . , and 27 execute parallel decoding processing with respect to the inverse quantization processing and the inverse transformation processing.

Further, according to the parsing of the syntax of the coding bit stream BS by the parsing unit 10, the parallel processing related to the motion compensation processing and the filter processing is made possible by the video processing units 20, 21, 22, 23, . . . , and 27. Thus, a plurality of intermediate streams including a plurality of blocks which can be processed in parallel with respect to the motion compensation processing and the filter processing are generated from the parsing unit 10 by the video processing units 20, 21, 22, 23, . . . , and 27 and supplied to the video processing units 20, 21, 22, 23, . . . , and 27 respectively. As a result, the video processing units 20, 21, 22, 23, . . . , and 27 execute parallel decoding processing with respect to the motion compensation processing and the filter processing.

<<Timings for Parallel Decoding Processing>>|

FIG. 4 is a diagram showing timings at which the first video processing unit 20 (CE00) and the second video processing unit 21 (CE01) both shown in FIG. 2 respectively perform parallel decoding processing on the sixteen small coding units CU0, CU1, CU2, . . . , and CU15 shown in FIG. 3, using the intra predictions.

At the first timing T0 as shown in FIG. 4, two times of NO operations (NOP) are performed by the second video processing unit 21 (CE01) in parallel with the first and second coding units CU0 and CU1 being sequentially decoding-processed by the first video processing unit 20 (CE00).

A region for the two times of NO operations (NOP) shown in FIG. 4 corresponds to the inclined wavefront necessary for the parallel processing of the LCU described in the Non-Patent Document 3.

At the second timing T1 shown in FIG. 4, the fifth and sixth coding units CU4 and CU5 are sequentially decoding-processed by the second video processing unit 21 (CE01) in parallel with the third and fourth coding units CU2 and CU3 being sequentially decoding-processed by the first video processing unit 20 (CE00). Here, a decoding processing result using the intra prediction of the second coding unit CU1 by the first video processing unit 20 (CE00) at the first timing T0 is used for decoding processing using the intra prediction of the fifth coding unit CU4 by the second video processing unit 21 (CE01) at the second timing T1. That is, the decoding processing result using the intra prediction of the second coding unit CU1 by the first video processing unit 20 (CE00) at the first timing T0 is supplied from the first video processing unit 20 (CE00) to the second video processing unit 21 (CE01) through the inter-unit signal bus 41 shown in FIG. 1.

At the third timing T2 shown in FIG. 4, the ninth and tenth coding units CU8 and CU9 are sequentially decoding-processed by the second video processing unit 21 (CE01) in parallel with the seventh and eighth coding units CU6 and CU7 being sequentially decoding-processed by the first video processing unit 20 (CE00). Here, a decoding processing result using the intra prediction of the third coding unit CU2 by the first video processing unit 20 (CE00) at the second timing T1 is used for decoding processing using the intra prediction of the ninth coding unit CU8 by the second video processing unit 21 (CE01) at the third timing T2. That is, the decoding processing result using the intra prediction of the third coding unit CU2 by the first video processing unit 20 (CE00) at the second timing T1 is supplied from the first video processing unit 20 (CE00) to the second video processing unit 21 (CE01) through the inter-unit signal bus 41 shown in FIG. 1.

At the fourth timing T3 shown in FIG. 4, the thirteenth and fourteenth coding units CU12 and CU13 are sequentially decoding-processed by the second video processing unit 21 (CE01) in parallel with the eleventh and twelfth coding units CU10 and CU11 being sequentially decoding-processed by the first video processing unit 20 (CE00). Here, a decoding processing result using the intra prediction of the ninth coding unit CU8 by the second video processing unit 21 (CE01) at the third timing T2 is used for decoding processing using the intra prediction of the eleventh coding unit CU10 by the first video processing unit 20 (CE00) at the fourth timing T3. That is, the decoding processing result using the intra prediction of the ninth coding unit CU8 by the second video processing unit 21 (CE01) at the third timing T2 is supplied from the second video processing unit 21 (CE01) to the first video processing unit 20 (CE00) through the inter-unit signal bus 41 shown in FIG. 1.

At the fifth timing T4 shown in FIG. 4, the two times of operations (OPE) are performed by the second video processing unit 21 (CE01) in parallel with the fifteenth and sixteenth coding units CU14 and CU15 being sequentially decoding-processed by the first video processing unit 20 (CE00). The two times of operations executed by the second video processing unit 21 (CE01) are intended for sequentially decoding-processing the first and second coding units CU0 and CU1 lying inside the largest coding unit LCU01 arranged in the first row/second column of the liquid crystal display device of FIG. 9.

Thus, the first video processing unit 20 (CE00) and the second video processing unit 21 (CE01) shown in FIG. 2 perform the parallel decoding processing on the internal information of the sixty-four largest coding units LCU00, LCU01, LCU02, . . . , and LCU063 transversely arranged in the first row of the liquid crystal display device shown in FIG. 9.

<<Parallel Decoding Processing by Eight Video Processing Units>>

FIG. 5 is a diagram illustrating timings taken to execute parallel decoding processing of internal information of largest coding units LCUs corresponding to four rows by the eight video processing units 20, 21, 22, 23, . . . , and 27 shown in FIG. 1.

The first dotted frame in FIG. 5 indicates timings at which the first video processing unit 20 (CE00) and the second video processing unit 21 (CE01) shown in FIG. 2 perform parallel decoding processing on the information of the sixteen small coding units CU0, CU1, CU2, . . . , and CU15 lying inside the largest coding unit LCU00 corresponding to the first row of the liquid crystal display device shown in FIG. 9.

Even at the beginning of the first dotted frame in FIG. 5, the two times of NO operations (NOP) are executed by the second video processing unit 21 (CE01) as with the first timing T0 of FIG. 4 in parallel with the first and second coding units CU0 and CU1 being sequentially decoding-processed by the first video processing unit 20 (CE00).

Even at the end of the first dotted frame in FIG. 5, the two times of operations (OPE) are executed by the second video processing unit 21 (CE01) as with the fifth timing T4 of FIG. 4 in parallel with the fifteenth and sixteenth coding units CU14 and CU15 being sequentially decoding-processed by the first video processing unit 20 (CE00).

The second dotted frame in FIG. 5 indicates timings at which the third video processing unit 22 (CE10) and the fourth video processing unit 23 (CE11) shown in FIG. 2 perform parallel decoding processing on the information of the sixteen small coding units CU0, CU1, CU2, . . . , and CU15 lying inside the largest coding unit LCU10 corresponding to the second row of the liquid crystal display device shown in FIG. 9.

Even at the beginning of the second dotted frame in FIG. 5, the two times of NO operations (NOP) are executed by the fourth video processing unit 23 (CE11) as with the first timing T0 of FIG. 4 in parallel with the first and second coding units CU0 and CU1 being sequentially decoding-processed by the third video processing unit 22 (CE10).

Even at the end of the second dotted frame in FIG. 5, the two times of operations (OPE) are executed by the fourth video processing unit 23 (CE11) as with the fifth timing T4 of FIG. 4 in parallel with the fifteenth and sixteenth coding units CU14 and CU15 being sequentially decoding-processed by the third video processing unit 22 (CE10).

The third dotted frame in FIG. 5 indicates timings at which the fifth video processing unit 24 (CE20) and the sixth video processing unit 25 (CE21) shown in FIG. 2 perform parallel decoding processing on the information of the sixteen small coding units CU0, CU1, CU2, . . . , and CU15 lying inside the largest coding unit LCU20 corresponding to the third row of the liquid crystal display device shown in FIG. 9.

Even at the beginning of the third dotted frame in FIG. 5, the two times of NO operations (NOP) are executed by the sixth video processing unit 25 (CE21) as with the first timing T0 of FIG. 4 in parallel with the first and second coding units CU0 and CU1 being sequentially decoding-processed by the fifth video processing unit 24 (CE20).

Even at the end of the third dotted frame in FIG. 5, the two times of operations (OPE) are executed by the sixth video processing unit 25 (CE21) as with the fifth timing T4 of FIG. 4 in parallel with the fifteenth and sixteenth coding units CU14 and CU15 being sequentially decoding-processed by the fifth video processing unit 24 (CE20).

The fourth dotted frame in FIG. 5 indicates timings at which the seventh video processing unit 26 (CE30) and the eighth video processing unit 27 (CE31) shown in FIG. 2 perform parallel decoding processing on the information of the sixteen small coding units CU0, CU1, CU2, . . . , and CU15 lying inside the largest coding unit LCU30 corresponding to the fourth row of the liquid crystal display device shown in FIG. 9.

Even at the beginning of the fourth dotted frame in FIG. 5, the two times of NO operations (NOP) are executed by the eighth video processing unit 27 (CE31) as with the first timing T0 of FIG. 4 in parallel with the first and second coding units CU0 and CU1 being sequentially decoding-processed by the seventh video processing unit 26 (CE30).

Even at the end of the fourth dotted frame in FIG. 5, the two times of operations (OPE) are executed by the eighth video processing unit 27 (CE31) as with the fifth timing T4 of FIG. 4 in parallel with the fifteenth and sixteenth coding units CU14 and CU15 being sequentially decoding-processed by the seventh video processing unit 26 (CE30).

As shown in FIG. 5, the execution of the two times of NO operations (NOP) by the second video processing unit 21, the execution of the two times of NO operations (NOP) by the fourth video processing unit 23, the execution of the two times of NO operations (NOP) by the sixth video processing unit 25, and the execution of the two times of NO operations (NOP) by the eighth video processing unit 27 are first carried out in parallel. It can however be understood that the overheads of the two times of NO operation (NOP) executed by parallel decoding processing of LCUs corresponding to four rows in FIG. 5 are significantly reduced than the overheads of the NO operations (NOP) in the form of the triangle shown in FIG. 10, which have been discussed by the present inventors prior to the present invention.

<<Parallel Decoding Processing of Small Coding Units>>

Figure 6:
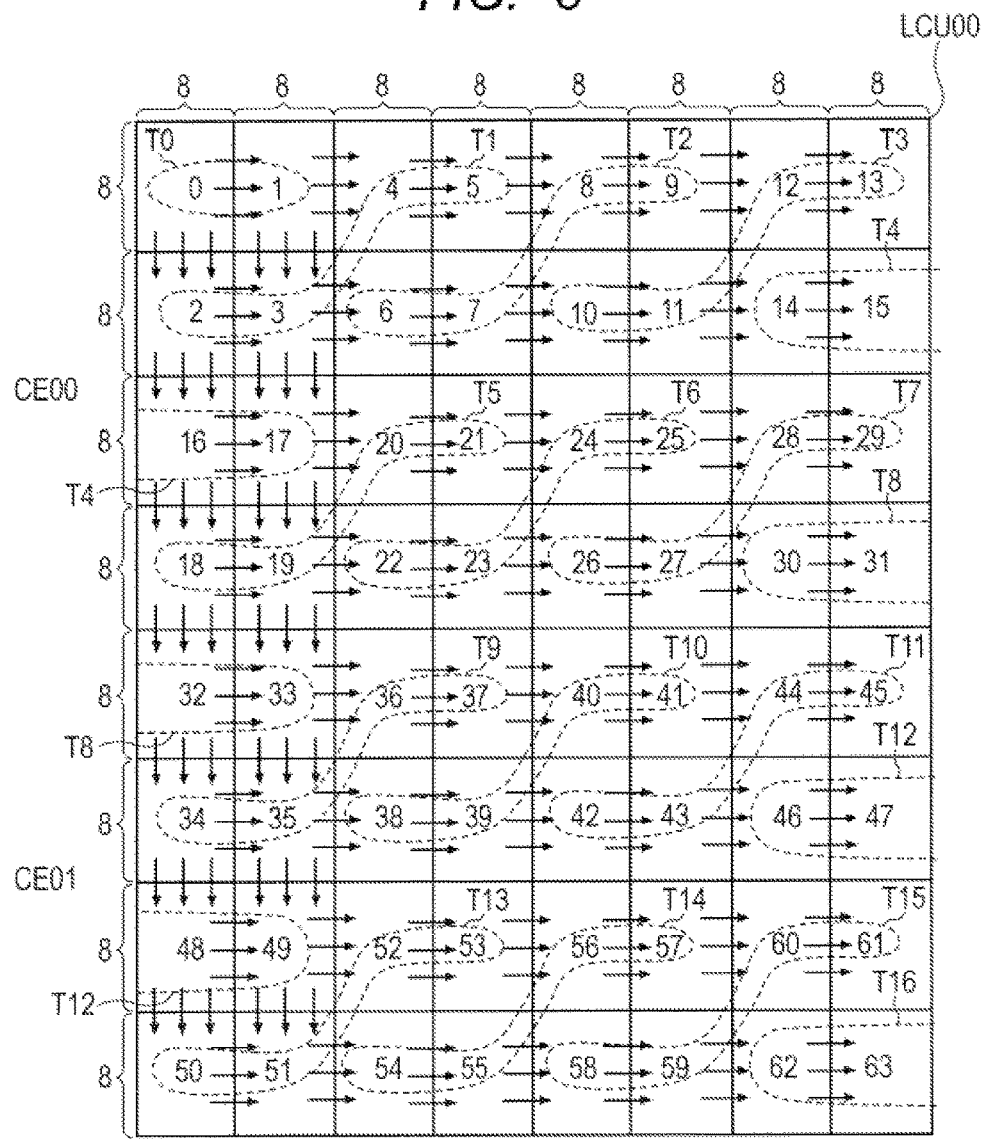
FIG. 6 is a diagram showing the manner in which the first video processing unit 20 (CE00) and the second video processing unit 21 (CE01) both described in FIG. 2 respectively execute parallel decoding processing on information of sixty-four smaller coding units CU0, CU1, CU2, . . . , and CU63 lying inside the largest coding unit LCU00 arranged in the first row/first column of the liquid crystal display device shown in FIG. 9 in relation to intra predictions.

FIG. 6 is a diagram showing the manner in which the first video processing unit 20 (CE00) and the second video processing unit 21 (CE01) both described in FIG. 2 respectively execute parallel decoding processing on information of sixty-four smaller coding units CU0, CU1, CU2, . . . , and CU63 lying inside the largest coding unit LCU00 arranged in the first row/first column of the liquid crystal display device shown in FIG. 9 with respect to the intra predictions.

As shown in FIG. 6, one largest coding unit LCU00 has the maximum size of 64 pixels×64 pixels, whereas each of the sixty-four small coding units CU0, CU1, CU2, . . . , and CU63 has a smaller size of 8 pixels×8 pixels. The eight small coding units CU0, CU1, CU4, CU5, . . . , CU12, and CU13 are arranged in the first row, and the eight small coding units CU2, CU3, CU6, CU7, . . . , CU14 and CU15 are arranged in the second row. The eight small coding units CU16, CU17, CU20, . . . , CU28, and CU29 are arranged even in the third row, and the eight small coding units CU18, CU19, CU22, CU23, . . . , CU30 and CU31 are arranged even in the fourth row. Those from the fifth to eighth rows are as shown in FIG. 6, and their description will be omitted.

As shown in FIG. 6, at a first timing T0, the first and second coding units CU0 and CU1 are sequentially decoding-processed by the first video processing unit 20 (CE00). At a second timing T1, the fifth and sixth coding units CU4 and CU5 are sequentially decoding-processed by the second video processing unit 21 (CE01) in parallel with the third and fourth coding units CU2 and CU3 being sequentially decoding-processed by the first video processing unit 20

(CE00). Incidentally, the second coding unit CU1 is intra-predicted from the first coding unit CU0, and the third coding unit CU2 is also intra-predicted from the first coding unit CU0. The fourth coding unit CU3 is intra-predicted from the second coding unit CU1. Further, the fifth coding unit CU4 is intra-predicted from the second coding unit CU1, and the sixth coding unit CU5 is intra-predicted from the fifth coding unit CU4.

At a third timing T2, the ninth and tenth coding units CU8 and CU9 are sequentially decoding-processed by the second video processing unit 21 (CE01) in parallel with the seventh and eighth coding units CU6 and CU7 being sequentially decoding-processed by the first video processing unit 20 (CE00). Incidentally, the seventh coding unit CU6 is intra-predicted from the fourth coding unit CU3, and the eighth coding unit CU7 is intra-predicted from the seventh coding unit CU6. Further, the ninth coding unit CU8 is intra-predicted from the sixth coding unit CU5, and the tenth coding unit CU9 is intra-predicted from the ninth coding unit CU8.

At a fourth timing T3, the thirteenth and fourteenth coding units CU12 and CU13 are sequentially decoding-processed by the second video processing unit 21 (CE01) in parallel with the eleventh and twelfth coding units CU10 and CU11 being sequentially decoding-processed by the first video processing unit 20 (CE00). Incidentally, the eleventh coding unit CU10 is intra-predicted from the eighth coding unit CU7, and the twelfth coding unit CU11 is intra-predicted from the eleventh coding unit CU10. Further, the thirteenth coding unit CU12 is intra-predicted from the tenth coding unit CU9, and the fourteenth coding unit CU13 is intra-predicted from the thirteenth coding unit CU12.

At a fifth timing T4, the seventeenth and eighteenth coding units CU16 and CU17 are sequentially decoding-processed by the second video processing unit 21 (CE01) in parallel with the fifteenth and sixteenth coding units CU14 and CU15 being sequentially decoding-processed by the first video processing unit 20 (CE00). Incidentally, the fifteenth coding unit CU14 is intra-predicted from the twelfth coding unit CU11, and the sixteenth coding unit CU15 is intra-predicted from the fifteenth coding unit CU14. Further, the seventeenth coding unit CU16 is intra-predicted, from the third coding unit CU2, and the eighteenth coding unit CU17 is intra-predicted from the seventeenth coding unit CU16.

At a sixth timing T5, the twenty-first and twenty-second coding units CU20 and CU21 are sequentially decoding-processed by the second video processing unit 21 (CE01) in parallel with the nineteenth and twentieth coding units CU18 and CU19 being sequentially decoding-processed by the first video processing unit 20 (CE00). Incidentally, the nineteenth coding unit CU18 is intra-predicted from the seventeenth coding unit CU16, and the twentieth coding unit CU19 is intra-predicted from the nineteenth coding unit CU18. Further, the twenty-first coding unit CU20 is intra-predicted from the eighteenth coding unit CU17, and the twenty-second coding unit CU21 is intra-predicted from the twenty-first coding unit CU20.

At a seventh timing T6, the twenty-fifth and twenty-sixth coding units CU24 and CU25 are sequentially decoding-processed by the second video processing unit 21 (CE01) in parallel with the twenty-third and twenty-fourth coding units CU22 and CU23 being sequentially decoding-processed by the first video processing unit 20 (CE00). Incidentally, the twenty-third coding unit CU22 is intra-predicted from the twentieth coding unit CU19, and the twenty-fourth coding unit. CU23 is intra-predicted from the twenty-third coding unit CU22. Further, the twenty-fifth coding unit CU24 is intra-predicted from the twenty-second coding unit CU21, and the twenty-sixth coding unit CU25 is intra-predicted from the twenty-fifth coding unit CU24.

At an eighth timing T7, the twenty-ninth and thirtieth coding units CU28 and CU29 are sequentially decoding-processed by the second video processing unit 21 (CE01) in parallel with the twenty-seventh and twenty-eighth coding units CU26 and CU27 being sequentially decoding-processed by the first video processing unit 20 (CE00). Incidentally, the twenty-seventh coding unit CU26 is intra-predicted from the twenty-fourth coding unit CU23, and the twenty-eighth coding unit CU27 is intra-predicted from the twenty-seventh coding unit CU26. Further, the twenty-ninth coding unit CU28 is intra-predicted from the twenty-sixth coding unit CU25, and the thirtieth coding unit CU29 is intra-predicted from the twenty-ninth coding unit CU28.

Since the operations from ninth to sixteenth timings T8 to T15 shown in FIG. 6 are similar to those from the above-described first to eighth timings T0 to T7, their description will be omitted.

At a seventeenth timing T16 shown in FIG. 6, the sixty-third and sixty-fourth coding units CU62 and CU63 are sequentially decoding-processed by the first video processing unit 20 (CE00). Incidentally, the sixty-third coding unit CU62 is intra-predicted from the sixtieth coding unit CU59, and the sixty-fourth coding unit CU63 is intra-predicted from the sixty-third coding unit CU62.

In the example of the embodiment 1 shown in FIG. 6, the first video processing unit 20 (CE00) and the second video processing unit 21 (CE01) divide the sixty-four small coding units CU0, CU1, CU2, . . . , and CU63 divided from one largest coding unit LCU00 into two to perform parallel decoding processing for the intra predictions. Thus, in the video decoding processing apparatus 1 according to the embodiment 1 shown in FIG. 1, the first video processing unit 20 (CE00) and the second video processing unit 21 (CE01) perform the above-described two division parallel processing even on the respective processing at the inverse quantization unit 201, the inverse transformation unit 202, the motion compensation unit 205 and the filter unit 208.

<<Timings for Parallel Decoding Processing>>

Figure 7:
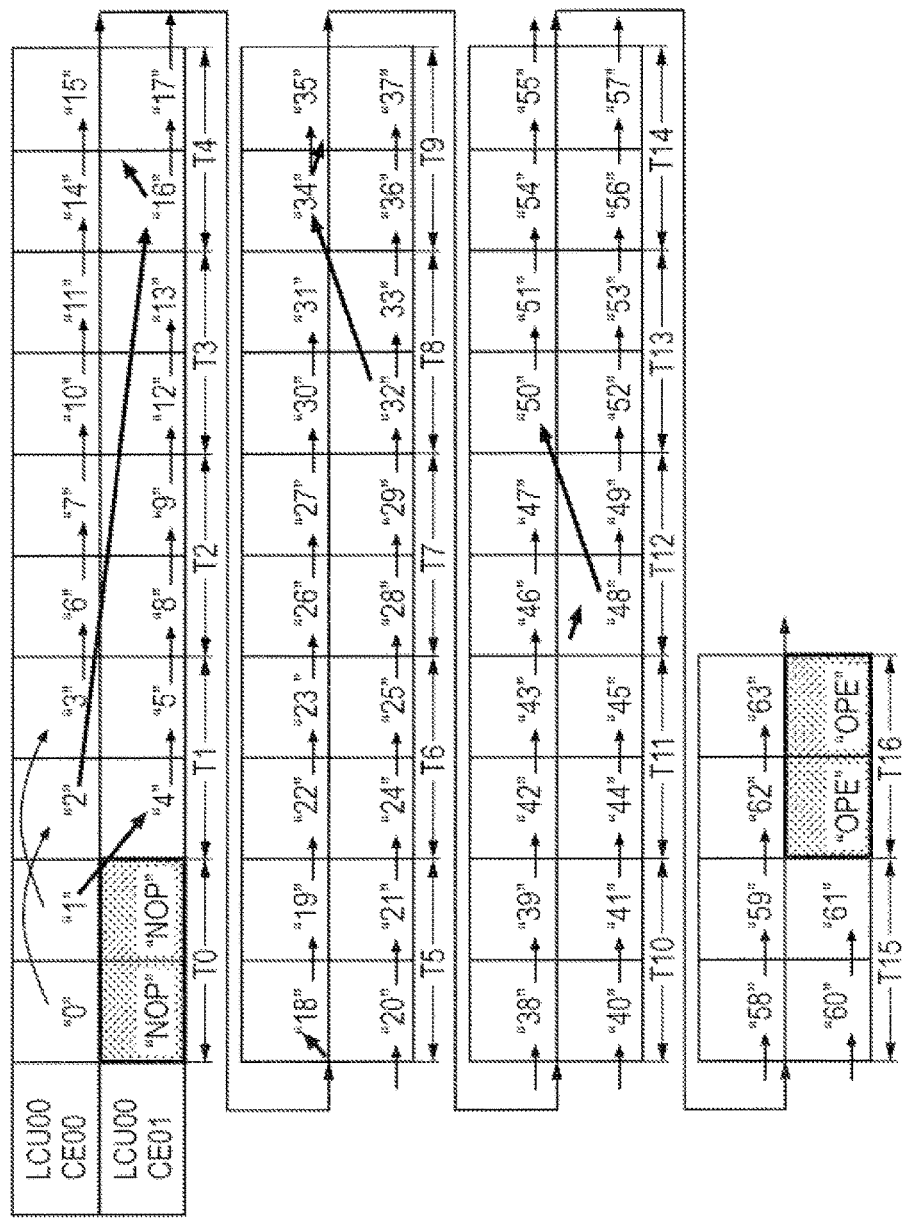
FIG. 7 is a diagram illustrating timings at which the first video processing unit 20 (CE00) and the second video processing unit 21 (CE01) both shown in FIG. 2 respectively perform parallel decoding processing on the information of the sixty-four small coding units CU0, CU1, CU2, . . . , CU63 shown in FIG. 6 using the intra predictions.

FIG. 7 is a diagram illustrating timings at which the first video processing unit 20 (CE00) and the second video processing unit 21 (CE01) both shown in FIG. 2 respectively perform parallel decoding processing on the information of the sixty-four small coding units CU0, CU1, CU2, . . . , and CU63 shown in FIG. 6 using the intra predictions.

At the first timing T0 shown in FIG. 7 exactly in the same manner as the first timing T0 shown in FIG. 6, two times of NO operations (NOP) are carried out by the second video processing unit 21 (CE01) in parallel with the first and second coding units CU0 and CU1 being sequentially decoding-processed by the first video processing unit 20 (CE00).

A region for the two times of NO operations (NOP) shown in FIG. 7 corresponds to an inclined wavefront necessary for the parallel processing of the LCU described in the Non-Patent Document 3.

A decoding processing result using the intra prediction of the second coding unit CU1 by the first video processing unit 20 (CE00) at the first timing T0 is used for decoding processing using the intra prediction of the fifth coding unit CU4 by the second video processing unit 21 (CE01) at the second timing T1. That is, the decoding processing result using the intra prediction of the second coding unit CU1 by the first video processing unit 20 (CE00) at the first timing T0 is supplied from the first video processing unit 20 (CE00)

to the second video processing unit 21 (CE01) through the inter-unit signal bus 41 shown in FIG. 1. Further, a decoding processing result using the intra prediction of the third coding unit CU2 by the first video processing unit 20 (CE00) at the second timing T1 is used for decoding processing using the intra prediction of the seventeenth coding unit CU16 by the second video processing unit 21 (CE01) at the fifth timing T4. That is, the decoding processing result using the intra prediction of the third coding unit CU2 by the first video processing unit 20 (CE00) at the second timing T1 is supplied from the first video processing unit 20 (CE00) to the second video processing unit 21 (CE01) through the inter-unit signal bus 41 shown in FIG. 1. Furthermore, a decoding processing result using the intra prediction of the seventeenth coding unit CU16 by the second video processing unit 21 (CE01) at the fifth timing T4 is used for decoding processing using the intra prediction of the nineteenth coding unit CU18 by the first video processing unit 20 (CE00) at the sixth timing T5. That is, the decoding processing result using the intra prediction of the seventeenth coding unit CU16 by the second video processing unit 21 (CE01) at the fifth timing T4 is supplied from the second video processing unit 21 (CE01) to the first video processing unit 20 (CE00) through the inter-unit signal bus 41 shown in FIG. 1. Still further, a decoding processing result using the intra prediction of the thirty-third coding unit CU32 by the second video processing unit 21 (CE01) at the ninth timing T8 is used for decoding processing using the intra prediction of the thirty-fifth coding unit CU34 by the first video processing unit 20 (CE00) at the tenth timing T9. That is, the decoding processing result using the intra prediction of the thirty-third coding unit CU32 by the second video processing unit 21 (CE01) at the ninth timing T8 is supplied from the second video processing unit 21 (CE01) to the first video processing unit 20 (CE00) through the inter-unit signal bus 41 shown in FIG. 1. Still further, a decoding processing result using the intra prediction of the thirty-fifth coding unit CU34 by the first video processing unit 20 (CE00) at the tenth timing T9 is used for decoding processing using the intra prediction of the forty-ninth coding unit CU48 by the second video processing unit 21 (CE01) at the thirteenth timing T12. That is, the decoding processing result using the intra prediction of the thirty-fifth coding unit CU34 by the first video processing unit 20 (CE00) at the tenth timing T9 is supplied from the first video processing unit 20 (CE00) to the second video processing unit 21 (CE01) through the inter-unit signal bus 41 shown in FIG. 1. Still further, a decoding processing result using the intra prediction of the forty-ninth coding unit CU48 by the second video processing unit 21 (CE01) at the thirteenth timing T12 is used for decoding processing using the intra prediction of the fifty-first coding unit CU50 by the first video processing unit 20 (CE00) at the fourteenth timing T13. That is, the decoding processing result using the intra prediction of the forty-ninth coding unit CU48 by the second video processing unit 21 (CE01) at the thirteenth timing T12 is supplied from the second video processing unit 21 (CE01) to the first video processing unit 20 (CE00) through the inter-unit signal bus 41 shown in FIG. 1.

Since other operations from the second to sixteenth timings T1 to T15 shown in FIG. 7 are similar to those from the second to sixteenth timings T1 to T15 shown in FIG. 6, their description will be omitted.

At a seventeenth timing T16 shown in FIG. 7, two times of operations (OPE) are executed by the second video processing unit 21 (CE01) in parallel with the sixty-third and sixty-fourth coding units CU62 and CU63 being sequen- tially decoding-processed by the first video processing unit 20 (CE00). The two times of operations (OPE) executed by the second video processing unit 21 (CE01) are intended to sequentially decoding-process the first and second coding units CU0 and CU1 lying inside the largest coding unit LCU01 arranged in the first row/second column of the liquid crystal display device shown in FIG. 9.

The first video processing unit 20 (CE00) and the second video processing unit 21 (CE01) shown in FIG. 2 in this manner perform the parallel decoding processing on the internal information of the sixty-four largest coding units LCU00, LCU01, LCU02, . . . , and LCU063 transversely arranged in the first row of the liquid crystal display device shown in FIG. 9.

<<Parallel Decoding Processing by Eight Video Processing Units>>

Figure 8:
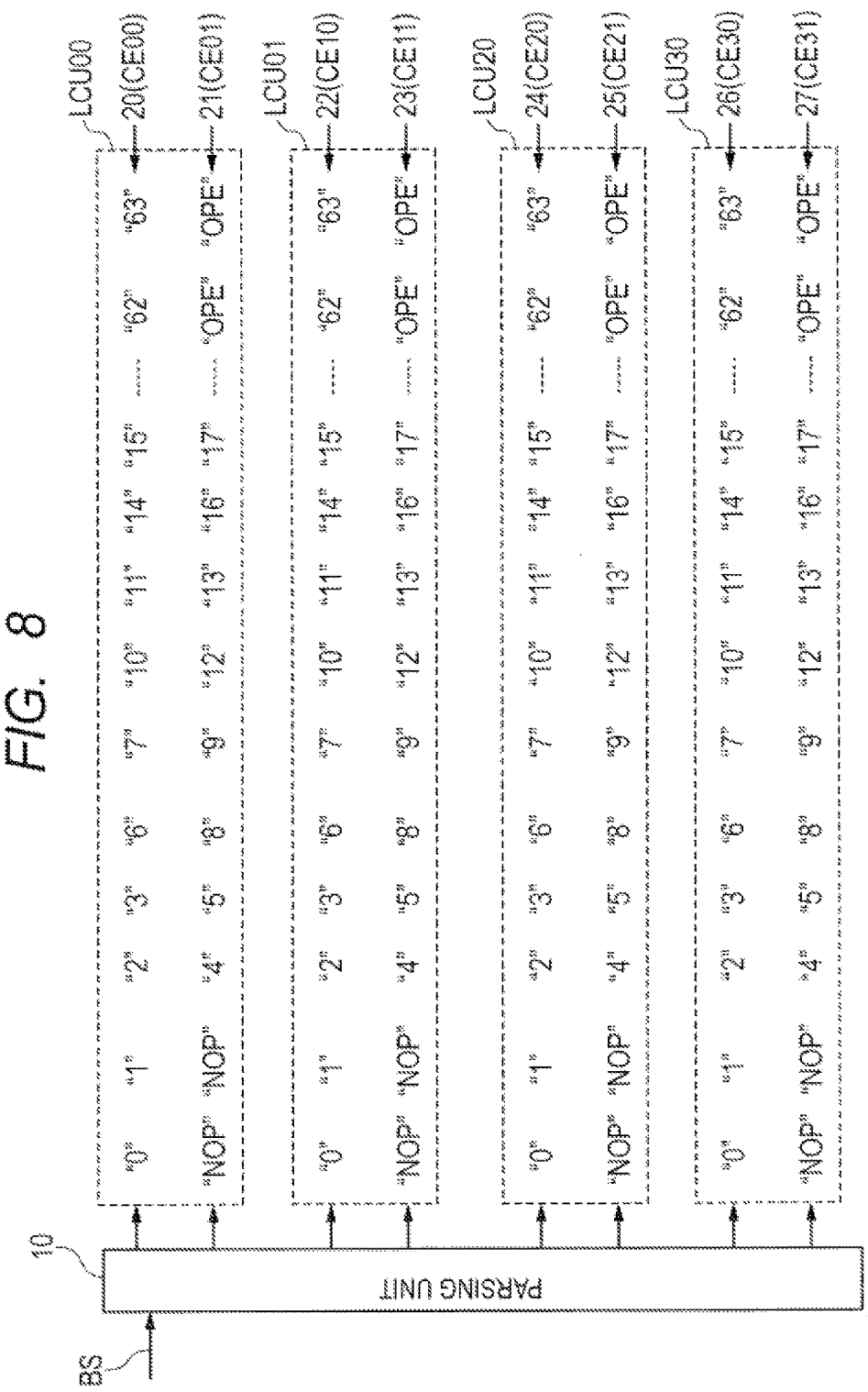
FIG. 8 is a diagram showing the manner of performing parallel decoding processing on internal information of the largest coding units LCUs corresponding to the four rows by the eight video processing units 20, 21, 22, 23, . . . , and 27 shown in FIG. 1.

FIG. 8 is a diagram showing the manner of performing parallel decoding processing on internal information of the largest coding units LCUs corresponding to the four rows by the eight video processing units 20, 21, 22, 23, . . . , and 27 shown in FIG. 1.

While the parallel decoding processing of the internal information of the largest coding units LCUs corresponding to the four rows by the eight video processing units 20, 21, 22, 23, . . . , and 27 shown in FIG. 8 is similar to the parallel decoding processing shown in FIG. 5, the differences between the two are as follows:

Even at the end of FIG. 8, two times of operations (OPE) are executed by the second video processing unit 21 (CE01) in parallel with the sixty-third and sixty-fourth coding units CU62 and CU63 being sequentially decoding-processed by the first video processing unit 20 (CE00) exactly in the same manner as the seventeenth timing T16 of FIG. 7. The two times of operations (OPE) executed by the second video processing unit 21 (CE01) are intended to sequentially decoding-process the first and second coding units CU0 and CU1 lying inside the largest coding unit LCU01 arranged in the first row/second column of the liquid crystal display device shown in FIG. 9.

While the invention made above by the present inventors has been described specifically on the basis of the various embodiments, the present invention is not limited to the embodiments. It is needless to say that various changes can be made thereto within the scope not departing from the gist thereof.

For example, the present video decoding processing apparatus is not limited only to the decoding processing of the coding bit stream BS that conforms to the H. 265/HEVC standard.

That is, the present video decoding processing apparatus can also be applied to decoding processing of a coding bit stream BS based on a standard appearing in the future with, as a processing unit, a largest coding unit (LCU) having a maximum size larger than 64×6 pixels besides the H. 265/HEVC standard with the largest coding unit (LCU) having the maximum size of 64×64 pixels as the processing unit.

Further, the present video decoding processing apparatus can also be applied to decoding processing of a coding bit stream BS encoded based on the H. 265/HEVC standard with, as a processing unit, a largest coding unit (LCU) having, for example, a size of 32×32 pixels smaller than the maximum size of 64×64 pixels.

In the examples shown in FIGS. 3 and 4, the first video processing unit 20 (CE00) and the second video processing unit 21 (CE01) have divided the sixteen small coding units CU0, CU1, CU2, . . . , and CU15 divided from one largest coding unit LCU00 into the two to perform the parallel decoding processing using the intra predictions. Even other than it, the first video processing unit 20 (CE00) and the second video processing unit 21 (CE01) can also divide the four coding units CU0, CU1, CU2 and CU3 divided from one largest coding unit LCU00 into two to perform parallel decoding processing using intra predictions.

Further, the present video decoding processing apparatus is not limited only to the fact that the two video processing units of the eight video processing units 20, 21, 22, 23, . . . , and 27 perform parallel decoding processing on the information of the plural small coding units lying inside the largest coding unit (LCU) lying in one row, using the intra predictions. That is, the two video processing units are also capable of performing the parallel decoding processing on the information of the plural small coding units lying inside the largest coding unit (LCU) lying in one row, using inter predictions. In the case of the inter predictions, a frame different from the frame including the largest coding units (LCU) targeted for the decoding processing is selected as a reference frame.

Furthermore, the present video decoding processing apparatus is also capable of processing the thirty-two largest coding units (LCU) longitudinally arranged on the short side of the display screen having the size of 4096 pixels×2048 pixels using only the two video processing units 20 and 21 shown in FIG. 1. That is, it is also possible to perform, with respect to the intra predictions, parallel decoding processing on information of a plurality of small coding units lying inside the largest coding unit (LCU) corresponding to each of thirty-two rows, using only the two video processing units 20 and 21.

What is claimed is:

1. A video decoding processing apparatus, comprising:
a parsing circuitry configured to:
receive a coding bit stream including information of each largest coding unit of a plurality of largest coding units forming a picture, each of the largest coding units having a prescribed pixel size;
perform entropy decoding of a syntax of the coding bit stream at the largest coding unit level to thereby divide each largest coding unit into smaller coding units; and
generate a first intermediate stream and a second intermediate stream from a first largest coding unit of the plurality of largest coding units by dividing the first largest coding unit into a plurality of smaller coding units, the first intermediate stream including one or more of the plurality of smaller coding units arranged in a first row of the first largest coding unit, and the second intermediate streaming including one or more of the plurality of smaller coding units arranged in second row of the first largest coding unit; and
first and second video processing units configured t receive the first and second intermediate streams, respectively, from the parsing circuitry and perform decoding processing on the first and second intermediate streams in parallel.

2. The video decoding processing apparatus according to claim 1,
wherein the first video processing unit and the second video processing unit respectively have a function of intra prediction and a function of inter prediction, and
wherein the first video processing unit and the second video processing unit perform parallel decoding processing on the first intermediate stream and the second intermediate stream with respect to at least either one of the intra prediction and the inter prediction.

3. The video decoding processing apparatus according to claim 2, further comprising a first signal path coupled between the first video processing unit and the second video processing unit,
wherein a decoding processing result using the intra prediction by either one of the first video processing unit and the second video processing unit is capable of being supplied to the other of the first video processing unit and the second video processing unit through the first signal path.

4. The video decoding processing apparatus according to claim 3,
wherein upon execution of the parallel decoding processing, the second video processing unit executes a NO operation at a timing at which the first video processing unit processes a first smaller coding unit included in the first intermediate stream.

5. The video decoding processing apparatus according to claim 4, wherein the parsing circuitry divides the first largest coding unit into at least four smaller coding units to thereby generate the first intermediate stream and the second intermediate stream.

6. The video decoding processing apparatus according to claim 5, wherein the first video processing unit and the second video processing unit respectively have a function of inverse quantization, a function of inverse transformation and a function of motion compensation.

7. The video decoding processing apparatus according to claim 6, wherein the first video processing unit and the second video processing unit execute parallel decoding processing of the first intermediate stream and the second intermediate stream with respect to the inverse quantization and the inverse transformation.

8. The video decoding processing apparatus according to claim 6, wherein the first video processing unit and the second video processing unit execute parallel decoding processing of the first intermediate stream and the second intermediate stream with respect to the motion compensation.

9. The video decoding processing apparatus according to claim 6, further comprising a video construction unit having a first input terminal and a second input terminal respectively supplied with a processing result of the first video processing unit and a processing result of the second video processing unit,
wherein a decoded picture suppliable to a display device is generated from an output terminal of the video construction unit.

10. The video decoding processing apparatus according to claim 5, further comprising third and fourth video processing units,
wherein the parsing circuitry further generates parallel-processable third and fourth intermediate streams from a second largest coding unit different from the first largest coding unit, and
wherein the third video processing unit and the fourth video processing unit parallel-process the third intermediate stream and the fourth intermediate stream generated from the parsing circuitry.

11. The video decoding processing apparatus according to claim 10, wherein the first largest coding unit and the second largest coding unit respectively correspond to display information arranged in one row of the display device and another display information arranged in a row next after the one row.

12. The video decoding processing apparatus according to claim 11, further comprising a second signal path coupled between the third video processing unit and the fourth video processing unit, wherein a decoding processing result using the intra prediction by either one of the third video processing unit and the fourth video processing unit is capable of being supplied to the other of the third video processing unit and the fourth video processing unit through the second signal path.

13. The video decoding processing apparatus according to claim 12, wherein at the timing, the third video processing unit processes a first smaller coding unit included in the third intermediate stream, and the second video processing unit executes a NO operation.

14. The video decoding processing apparatus according to claim 6, wherein the parsing circuitry, the first video processing unit and the second video processing unit respectively having the function of the intra prediction, the function of the inverse quantization, and the functions of the inverse transformation and the motion compensation, and the video construction unit are integrated inside a semiconductor chip of a semiconductor integrated circuit.

15. The video decoding processing apparatus according to claim 6, wherein the parsing circuitry executes entropy decoding of the syntax of the coding bit stream including the information of the largest coding unit based on the H. 265/HEVC standard.

16. The video decoding processing apparatus according to claim 15, wherein the largest coding unit has a maximum size of 64 pixels×64 pixels by the H. 265/HEVC standard.

17. A method for decoding a coding bit stream, the method comprising:

supplying to an input terminal of a parsing circuitry the coding bit stream, the coding bit stream including information of each largest coding unit of a plurality of coding units forming a picture, each of the largest coding units having a prescribed pixel size;

performing, by the parsing circuitry, entropy decoding of a syntax of the coding bit stream at the largest coding unit level to thereby divide the largest coding units into smaller coding units and to generate parallel-processable intermediate streams, the generating including generating first and second intermediate streams from a first largest coding unit of the plurality of largest coding units by dividing the first largest coding unit into a plurality of smaller coding units, the first intermediate stream including one or more of the plurality of smaller coding units arranged in a first row of the first largest coding unit, and the second intermediate stream including one or more of the plurality of smaller coding units arranged in a second row of the first largest coding unit; and performing parallel decoding processing on the first and second intermediate streams by processing the first intermediate stream by a first video processing unit and the second intermediate stream by a second video processing unit in parallel.

18. The method according to claim 17, wherein the first video processing unit and the second video processing unit respectively have a function of intra prediction and a function of inter prediction, and wherein the first video processing unit and the second video processing unit perform parallel decoding processing on the first intermediate stream and the second intermediate stream with respect to at least either one of the intra prediction and the inter prediction.

19. The method according to claim 18, wherein the video decoding processing apparatus further includes a first signal path coupled between the first video processing unit and the second video processing unit, and wherein a decoding processing result using the intra prediction by either one of the first video processing unit and the second video processing unit is capable of being supplied to the other of the first video processing unit and the second video processing unit through the first signal path.

20. The method according to claim 19, wherein upon execution of the parallel decoding processing, the second video processing unit executes a NO operation at a timing at which the first video processing unit processes a first smaller coding unit included in the first intermediate stream.

* * * * *